(12) United States Patent
Shimakage

(10) Patent No.: US 7,091,838 B2
(45) Date of Patent: Aug. 15, 2006

(54) LANE DEVIATION ALARM SYSTEM

(75) Inventor: Masayasu Shimakage, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 38 days.

(21) Appl. No.: 10/790,269

(22) Filed: Mar. 2, 2004

(65) Prior Publication Data
US 2004/0183663 A1 Sep. 23, 2004

(30) Foreign Application Priority Data
Mar. 11, 2003 (JP) ............................ 2003-065424

(51) Int. Cl.
*B60Q 1/00* (2006.01)
(52) U.S. Cl. .................. 340/436; 340/435; 340/901; 340/904; 340/937; 340/938; 701/1
(58) Field of Classification Search ............... 340/937, 340/938, 435, 436, 901, 904; 701/1
See application file for complete search history.

(56) References Cited

U.S. PATENT DOCUMENTS

| | | | | |
|---|---|---|---|---|
| 6,489,887 B1 * | 12/2002 | Satoh et al. | ............... | 340/436 |
| 6,732,021 B1 * | 5/2004 | Matsumoto et al. | ........... | 701/1 |
| 6,748,302 B1 * | 6/2004 | Kawazoe | ..................... | 701/1 |
| 6,894,606 B1 * | 5/2005 | Forbes et al. | ............... | 340/435 |
| 6,973,380 B1 * | 12/2005 | Tange et al. | .................. | 701/70 |

FOREIGN PATENT DOCUMENTS

| | | |
|---|---|---|
| JP | 8-5388 A | 1/1996 |
| JP | 2002-193055 A | 7/2002 |

OTHER PUBLICATIONS

Masato Abe, "Vehicle Dynamics and Control", (third edition) May 31, 1996, pp. 60-70.

* cited by examiner

*Primary Examiner*—Jeffery Hofsass
*Assistant Examiner*—Edny Labbees
(74) *Attorney, Agent, or Firm*—Foley & Lardner LLP

(57) ABSTRACT

A lane deviation alarm system is comprised of a forward-observed-point calculating section that calculates a forward observed point by multiplying a vehicle speed of a host vehicle and an anticipated deviation time; a forward-observed-point lateral-displacement calculating section that calculates a lateral displacement at the forward-observed-point, on the basis of a yaw angle and the forward-observed-point; a lane deviation tendency determining section that determines whether the host vehicle is in a lane deviation tendency, on the basis of the forward-observed-point lateral-displacement; and a criteria changing section that changes a criteria for determining a lane deviation tendency of the host vehicle, on the basis of a detecting condition of the lane defining line.

18 Claims, 16 Drawing Sheets

FIG.14A
STATE OF CORRESPONDENCE
BETWEEN TRAVELING DIRECTION
AND VEHICLE DIRECTION

FIG.14B
STATE OF GENERATING DISACCORD
BETWEEN TRAVELING DIRECTION
AND VEHICLE DIRECTION

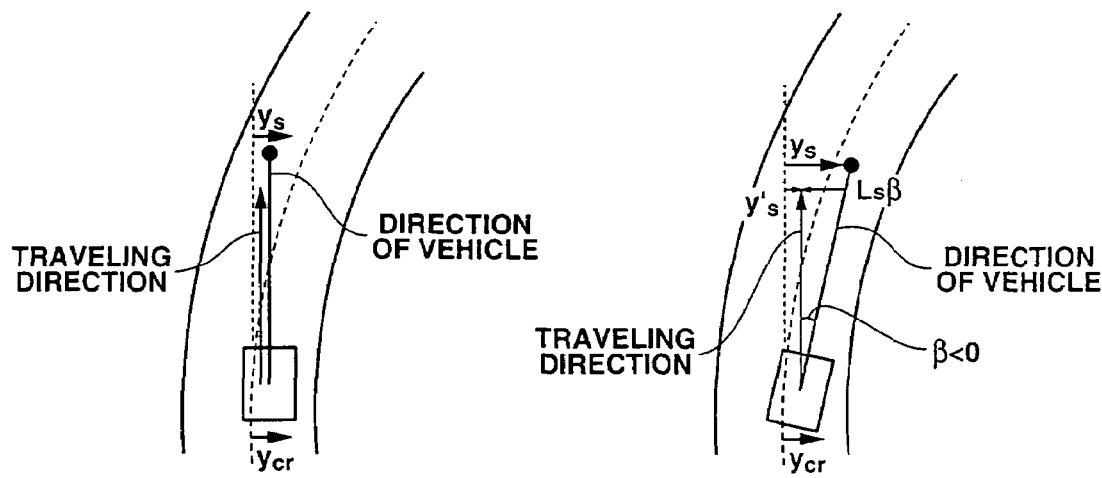

$y_s = y_{cr} + L_s\phi_r = y_{cr}$  <  $y_s = y_{cr} + L_s\phi_r = y_{cr} - L_s\beta$

CORRECTION BY SIDESLIP ANGLE $y'_s = y_s + L_s\beta = y_{cr}$

FIG.15

RELATIONSHIP BETWEEN TURN
ANGULAR SPEED AND
VEHICLE SPEED

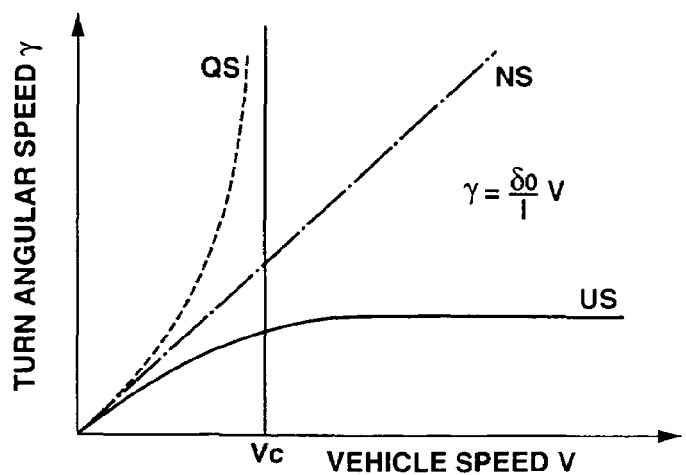

$\gamma = \frac{\delta_0}{l} V$

RELATIONSHIP BETWEEN SIDESLIP ANGLE AND VEHICLE SPEED AT CENTER OF GRAVITY

LANE DEVIATION ALARM SYSTEM

BACKGROUND OF THE INVENTION

The present invention relates to a lane deviation alarm system which generates an alarm indicative of a deviation of a vehicle from a traveling lane, on the basis of a picked-up image showing both lane defining lines of the traveling lane on a road.

Japanese Published Patent Application No. 2002-193055 discloses a lane deviation alarm system which informs a driver that a host vehicle deviates from a traveling lane by generating an alarm. More specifically, this lane deviation alarm system comprises an image picking-up section for picking up lane defining lines (white lines) of a traveling lane on a road, a yaw angle detecting section for obtaining a yaw angle of the host vehicle relative to the road, a road curvature estimating section for estimating a forward road curvature on the basis of an image picked up by the image picking-up section, a traveling curvature estimating section for estimating a traveling curvature from a traveling condition of the host vehicle, a lane deviation determining section for determining a lane deviation of the host vehicle on the basis of the information of a traveling road and the vehicle position, and an informing section for informing a lane deviation possibility to a driver when the host vehicle deviates from the traveling lane.

SUMMARY OF THE INVENTION

In case that the lane deviation is anticipated using a picked-up image indicative of lane defining lines, when only one of lane defining lines is detected, an estimation error of a vehicle position increases and therefore erroneous alarms tend to be generated. For example, when only one of lane defining lines is detected, a yaw angle of the host vehicle is erroneously estimated and largely fluctuates due to various factors such as a vehicle pitching. Consequently, an estimation error of the vehicle position relative to the traveling lane largely increases so as to tend to generate erroneous alarms. Herein, a situation that one of lane defining lines is detected includes a location limit such that lane defining line exists at only one side, such as at a splitting or merging lane on a highway, and a non-detection state of one lane defining line which is caused by Botts Dots or patchy looking of the lane-defining-line.

On the other hand, if the alarm is arranged to be temporally stopped in case that a non-detection state of one or both lane defining lines continues for a predetermined time, a rate of a system operation time decreases and therefore the validity of the system degrades. Further, if a sensibility of generating alarm is lowered while setting an alarm generating threshold at a high value, the alarm generation time delays although the frequency of the erroneous alarms decreases.

It is therefore an object of the present invention to provide an improved lane deviation alarm system which is capable of decreasing the frequency of erroneous alarms even when only one of both lane defining lines is detected.

An aspect of the present invention resides a lane deviation alarm system which comprises a lane defining line detecting section that detects a lane defining line of a lane traveled by a host vehicle; and a criteria changing section that changes a criteria for determining a lane deviation tendency of the host vehicle, on the basis of a detecting condition of the lane defining line.

Another aspect of the present invention resides in a method of generating an alarm when a lane deviation tendency of a host vehicle is determined, which method comprises an operation of detecting a lane defining line of a lane traveled by a host vehicle; and an operation of changing a criteria for determining a lane deviation tendency of the host vehicle, on the basis of a detecting condition of the lane defining line.

The other objects and features of this invention will become understood from the following description with reference to the accompanying drawings.

BRIEF DESCRIPTION OF THE DRAWINGS

FIGS. 14A and 14B are views explaining a reason of taking account of a vehicle-body sideslip angle $\beta$ when a lane-deviation tendency on a curve is determined.

FIG. 15 is a graph showing a relationship between a turn angular speed and a vehicle speed.

DETAILED DESCRIPTION OF THE INVENTION

Figure 1:
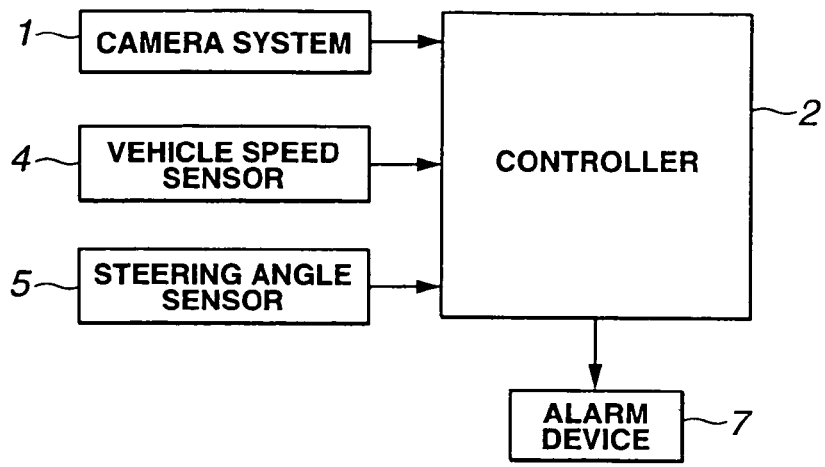
FIG. 1 is a block diagram showing a structure of a lane deviation alarm system according to a first embodiment of the present invention.

Referring to the drawings, there are discussed embodiments according to the present invention in detail.

Referring to FIGS. 1 to 18, there is shown a first embodiment of a lane deviation alarm system according to the present invention. As shown in FIG. 1, the lane deviation alarm system is installed in a host vehicle 10 and comprises a road recognition camera system 1, a controller 2, a vehicle speed sensor 4, a steering angle sensor 5 and an alarm device 7.

Figure 2A:
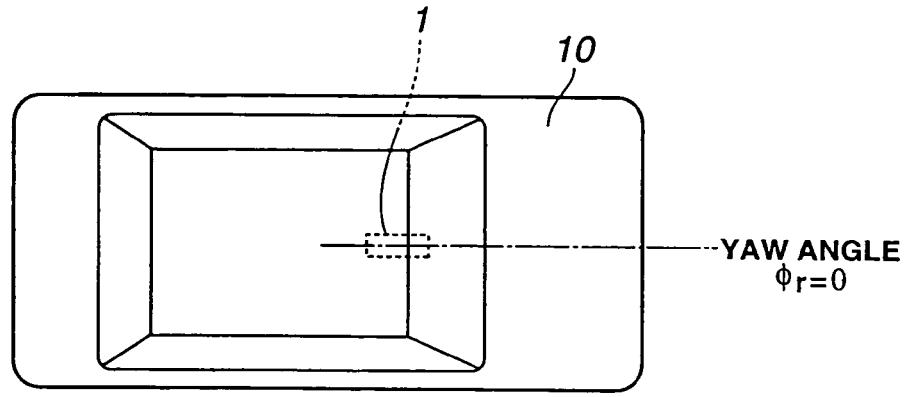
FIG. 2A is a top view showing a camera system equipped on a vehicle.
Figure 2B:
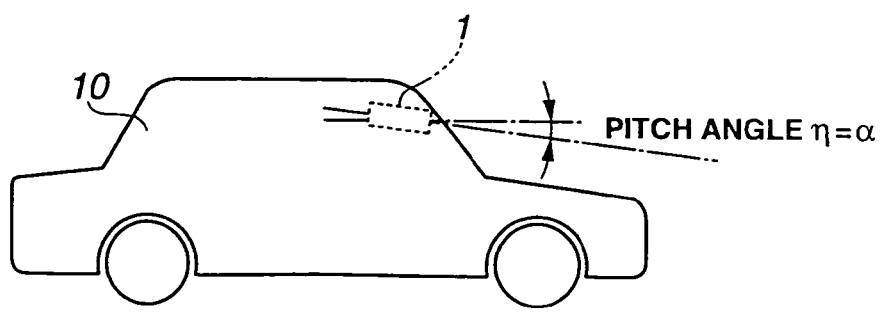
FIG. 2B is a side view showing the camera system equipped on the vehicle.

Camera system 1 is installed in a passenger compartment of host vehicle 10. More specifically, camera system 1 is installed at an upper and laterally center position near a front window as shown in FIGS. 2A and 2B so that a yaw angle between an optical axis of a lens of camera system 1 and a longitudinal center axis of vehicle 10 is 0 and a pitch angle therebetween is α. Camera system 1 takes an image of a road view within a range from several meters to several tens meters ahead of vehicle 10. Further, camera system 1 detects a relative positional relationship between host vehicle 10 and the lane defining lines of a traveling lane. Camera system 1 comprises a CCD (Charge Coupled Device) image sensor as an image taking section.

More specifically, camera system 1 obtains data of the image taken by a CCD of camera system 1. Camera system 1 processes the image in order to detect lane defining lines of a traveling lane. Camera system 1 transforms a shape of the lane defining lines into a mathematical model by using a plurality of parameters representative of a shape of the road shape and a vehicle behavior of vehicle 10. By updating the parameters so as to correspond the detection result of the lane defining lines with model lane lines, camera system 1 detects and recognizes the road parameters representative of the road shape and the vehicle behavior. Camera system 1 outputs the obtained road parameter to controller 2. Herein, the road parameters includes a lateral displacement $y_r$ at a center of gravity of vehicle 10 relative to the lane center line, yaw angle $\phi_r$ of vehicle 10 relative to the lane center line, pitch angle η of vehicle 10, a height h of camera system 1 from a road surface, a road curvature (an inverse of a radius of curvature) ρ, and a lane width W. The detailed explanation of the processing executed by camera system 1 will be discussed later.

Vehicle speed sensor 4 detects a vehicle speed of vehicle 10 by measuring a revolution speed of an output shaft of a transmission or a revolution speed of a wheel, and outputs a signal indicative of the detected vehicle speed to controller 2. Steering angle sensor 5 is a sensor for detecting a steering condition manipulated by a driver. More specifically, steering angle sensor 5 amplifies a rotational displacement of a steering shaft (not shown) which is integrally rotated with a steering wheel, directly or by means of a gear mechanism. Thereafter, steering angle sensor 5 detects the amplified rotational angle as a steering angle detection signal by means of an angle detecting mechanism such as a rotary encoder or potentiometer.

Controller 2 executes the various controls employed in the lane deviation alarm system according to the present invention. More specifically, controller 2 estimates a lane deviation tendency at the moment when a predetermined time elapsed from the present time moment, on the basis of the vehicle speed detected by vehicle speed sensor 4, the present steering angle detected by steering angle sensor 5, and the road parameters supplied from camera system 1. Herein the predetermined time into future is a time period necessary for moving vehicle 10 from a present vehicle position on the lane to a predetermined position. Controller 2 monitors a traveling condition of vehicle 10 while estimating the lane deviation tendency of vehicle 10 relative to the lane at a moment when the predetermined time elapsed from the present time.

When controller 2 determines that there is a high possibility that vehicle 10 deviates from the traveling lane, from an estimation result of the lane deviation tendency, controller 2 outputs a drive signal to an alarm device 7 to generate warning sound or displaying warning information so as to give a warning to the driver.

The detailed explanation as to the monitoring processing of the thus traveling condition will be discussed later.

Alarm device 7 has a function of giving a stimulation to the senses of sight, hearing, touch or the like of a driver, such as a buzzer, audio system, steering actuator or meter display device. By outputting an alarm sound, vibrations to the steering wheel, or an alarm display, controller 2 informs the driver that there increases the possibility of a lane deviation of vehicle 10 from the traveling lane. Thus, the lane deviation alarm system according to the present invention monitors a traveling condition of vehicle 10 while estimating the lane deviation tendency of vehicle 10 relative to the lane at a moment when the predetermined time elapsed from the present time. When there is a high possibility that vehicle 10 deviates from the traveling lane, the lane deviation alarm system warns the driver by applying the stimulations of giving a stimulation to the sense of sight, hearing, touch or the like of the driver, so as to effectively call the driver's attention.

Figure 3:
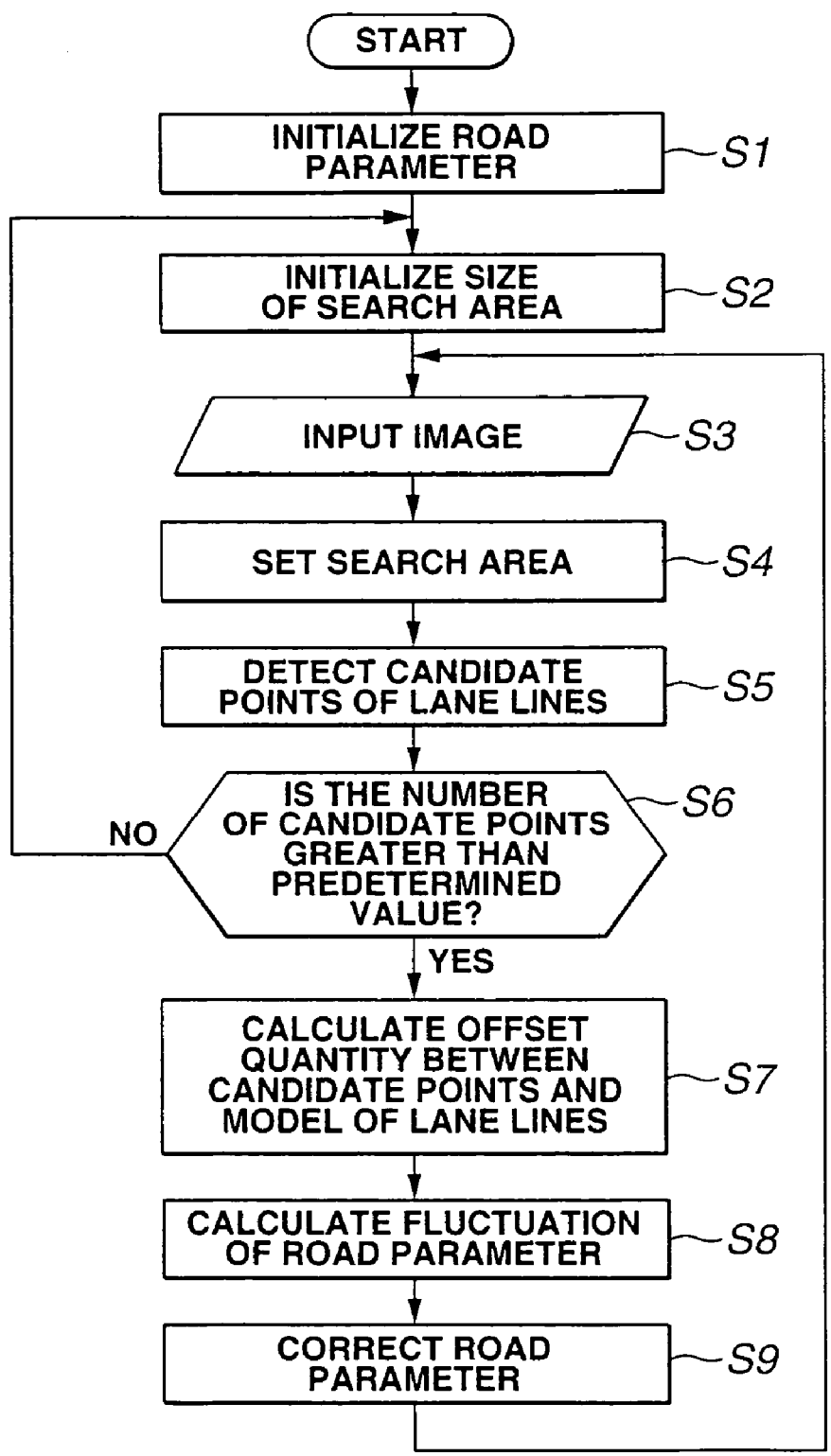
FIG. 3 is a flowchart showing a processing executed by the camera system.

Subsequently, the processing executed by camera system 1 is discussed. A flowchart of FIG. 3 shows a procedure of a lane defining line detect processing executed by camera system 1.

Figure 4:
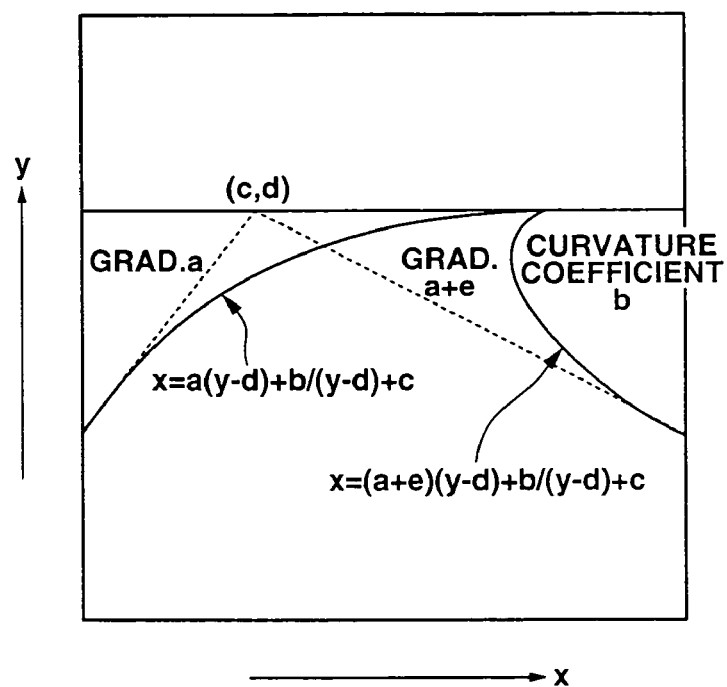
FIG. 4 is a view for explaining a model lane-defining lines.

At step S1 camera system 1 initializes the road parameters representative of a road shape and a vehicle behavior. FIG. 4 shows an image taken by camera system 1 and an X-Y image-plane coordinate system. In this coordinate system, model lane defining lines are represented by the following expressions (1) and (2) using the road parameters.

$$x=\{a-0.5e\}(y-d)+b/(y-d)+c \quad (1)$$

$$x=\{a+0.5e\}(y-d)+b/(y-d)+c \quad (2)$$

where the expression (1) is an expression adapted to a right hand side as viewed from vehicle 10, the expression (2) is an expression adapted to a left hand side as viewed from vehicle 10, a, b, c, d and e are the road parameters. Assuming that a vertical dimension between camera system 1 and a road surface is constant, road parameter a denotes a lateral displacement $y_{cr}$ of vehicle 10 between the lane defining lines, b denotes a road curvature ρ, c denotes yaw angle $\phi_r$ of vehicle 10 (the optical axis of camera system 1) relative to the road, d denotes pitch angle η of vehicle 10 (the optical axis of camera system 1) relative to the road, and e denotes dimension W between the lane defining lines.

Under the initial condition, the shape of the road and the lane defining lines and the vehicle behavior are set at values corresponding to center values, respectively, since the shapes of the road and the lane defining lines and the vehicle behavior are not clear in this initial condition. More specifically, road parameter a corresponding to the lateral displacement $y_{cr}$ of vehicle 10 within the lane defining lines is set at a center between the lane defining lines, road parameter b corresponding to road curvature ρ is set at straight (zero), road parameter c corresponding to yaw angle $\phi_r$ relative to the lane defining lines is set at zero, road parameter d corresponding to pitch angle η relative to the lane defining lines is set at α° indicative of a vehicle stopping condition, and road parameter e corresponding to lane width W between the lane defining lines is set at a lane width of a highway defined by the rule of a road structure.

More specifically, road parameters a, b, c, d and e are defined as follows. In case that a desired point in an actual coordinate system fixed in the vehicle is projected on an image coordinate system (x, y) wherein X-axis is a lateral (right and left) direction of vehicle 10, Y-axis is a vertical direction of vehicle 10, and Z-axis is a longitudinal (fore-and-aft) direction of vehicle 10, the corresponding image coordinate system (x, y) are expressed by the following expressions (3)

$$x=-(f/Z)X,\ y=-(f/Z)Y \quad (3)$$

where f is a lens parameter and is a coefficient corresponding to a focal length of a lens. Assuming that road curvature ρ is not so large and a road surface is flat, the coordinate of the lane defining lines relative to a vehicle center line (camera center line) along Z direction (forward direction) is expressed by the following expressions (4), (5) relating to the lateral direction and (6) relating to the vertical direction. Herein, the above assumption is for simplifying a model, and by increasing the dimension of the model, these expressions are available even under a general condition.

$$X=0.5\rho Z^2-\phi_r Z-y_{cr}-0.5W \quad (4)$$

$$X=0.5\rho Z^2-\phi_r Z-y_{cr}+0.5W \quad (5)$$

$$Y=\eta Z-h \quad (6)$$

where the expression (4) is an expression corresponding to the right hand side operation as viewed from vehicle 10, and the expression (5) is an expression corresponding to the left hand side operation as viewed from vehicle 10. By eliminating X, Y and Z from the expressions (3) through (6), the following expressions (7) and (8) are obtained.

$$x=(y_{cr}+0.5W)(y+f\eta)/h+f\phi_r-0.5f^2\rho h/(y+f\eta) \quad (7)$$

$$x=(y_{cr}-0.5W)(y+f\eta)/h+f\phi_r-0.5f^2\rho h/(y+f\eta) \quad (8)$$

where the expression (7) is an expression corresponding to the right hand side operation as viewed from vehicle 10, and the expression (8) is an expression corresponding to the left hand side operation as viewed from vehicle 10.

By normalizing each road parameter using the expressions (7) and (8) on the assumption the road width W, whose deviation is the smallest in those of the road parameters, is constant, lateral displacement $y_{cr}$ of vehicle 10, road curvature ρ, yaw angle $\phi_r$, and the height h of camera system 1 are expressed by the following expressions (9).

$$y_{cr}=W\cdot a/e,\ \rho=2b\cdot e/(f^2\cdot h),\ \phi_r=c/f,\ h=W\cdot e \quad (9)$$

Road parameters a, b, c, d and e are set in this manner. Accordingly, the road parameters are initialized at step S1, as discussed above.

Figure 5:
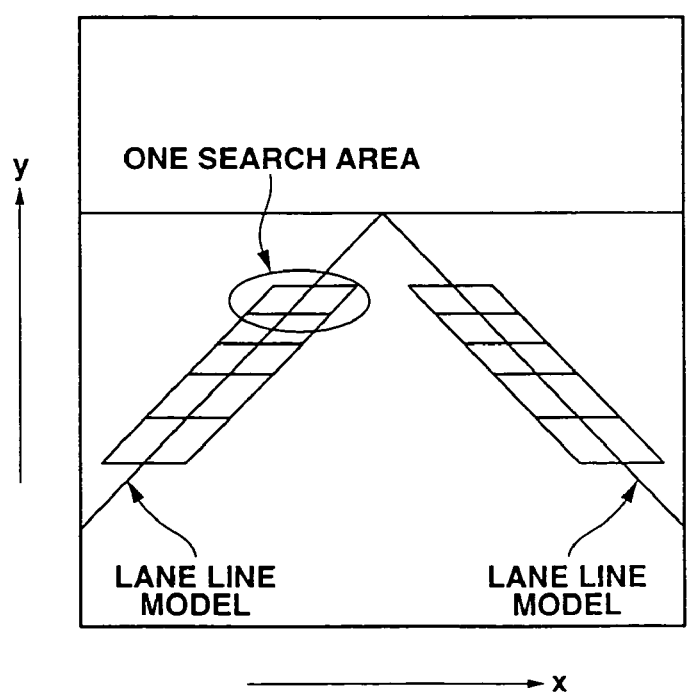
FIG. 5 is a view explaining a method of setting an initial value of a line candidate point detection area.

At step S2 camera system 1 initializes a side of small areas for detecting a candidate point of the lane defining line as shown in FIG. 5. As shown in FIG. 5, in this embodiment ten search areas including five right search areas and five left search areas are searched, and the size of each search area is set large. Under the initial condition, since it is supposed that there is a large difference between the model lane defining lines obtained by inputting the initial values into the respective road parameters a to e and the actual lane defining lines on the image plane, it is preferable that relatively large areas are set initially.

Figure 6:
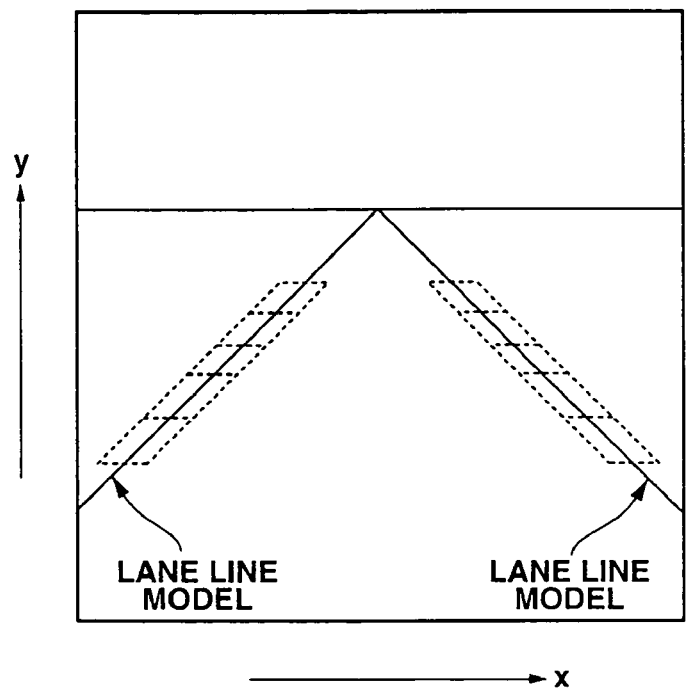
FIG. 6 is a view explaining the method of setting the initial value of the line candidate point detection area in case that actual lane defining lines have been already detected.

When the lane defining lines have been detected already in the previous processing, it is assumed that the difference between the actual lane defining lines and the mode lane defining lines is small. Therefore, as is apparent from the comparison with FIG. 5, the size of each search area is set small as possible, as shown in FIG. 6. By setting the size of each search area small, a possibility of an erroneous detection of detecting other objects is decreased. Further, it becomes possible to improve the processing speed of this processing.

At step S3 camera system 1 receives an image which was obtained by the image processing section of camera system 1.

At step S4 camera system 1 sets the search areas of the candidate lane defining lines on the road image produced by the image processing section through the processing at step S1. During this setting, the candidate lane-defining-line search areas on the road image are set on the basis of the candidate lane-defining-line search arrears obtained at step S2 and one of the road parameters initially set at step S1 and the model lane-defining lines corrected by the road parameters as discussed at step S9 discussed later.

Figure 7:
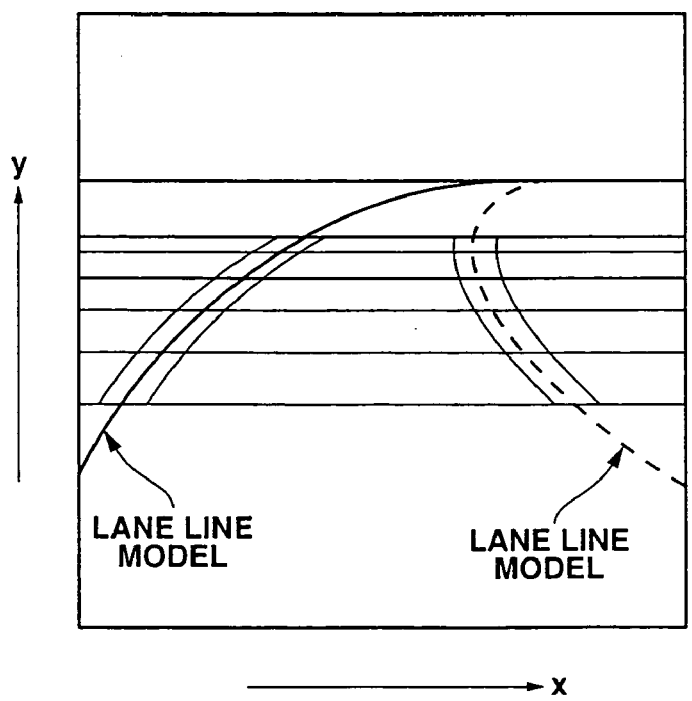
FIG. 7 is a view explaining the method of setting line candidate point detection areas on a picked-up image.

More specifically, the candidate lane-defining-line search areas are set on the road image so that the model lane-defining-lines are located at centers of the respective search areas as shown in FIG. 7. As shown in FIG. 7, the number of the lane-defining-line search areas is 10 constituted by 5 search areas for the right lane defining line and 5 search areas for the left lane defining line. It will be understood that the lane-defining-line search areas may be set at positions offset from the model lane defining lines according to the change of the past model lane defining lines., At step S5 camera system 1 detects the candidate point of the lane defining line in each lane-defining-line search area.

Figure 8:
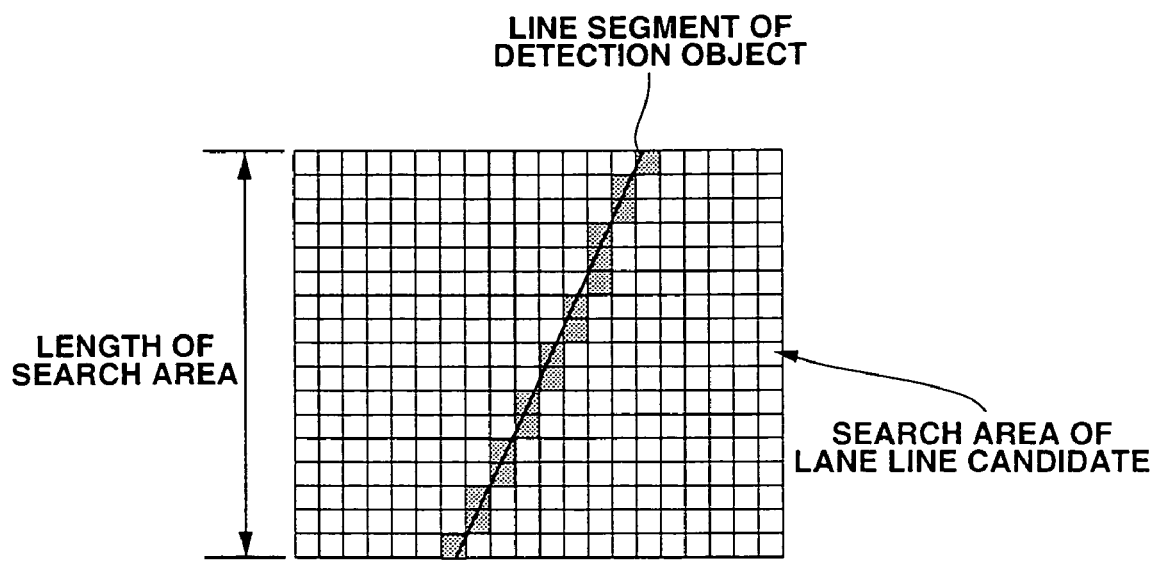
FIG. 8 is a view explaining a detecting method of the line candidate point.

In this detecting operation, first a differential image is produced by filtering the input image with a Sobel filter. Then camera system 1 counts suitable pixels which are located on the line segment and whose densities are greater than a value capable of extracting the detection line, relative to each line segment generated by connecting a point on an upper base line and a point on a lower base line of each search area, as shown in FIG. 8. Further the points on the upper and lower base lines are varied, and as to a predetermined number of the line segments the counting of the suitable pixels are executed. The line segment, which includes the largest number of the suitable pixels in the whole line segments, is determined as a detection straight line. The start and end of the detection straight line are determined as the lane-defining-line candidate points. When the number of the suitable pixels of the determined detection straight line is smaller than a predetermined rate to the number of pixels corresponding to the length of the search area, camera system 1 determines that there is no candidate lane-defining-line point in this search area.

For example, under a condition that the number of pixels corresponding to the length of the search are is 15 and the predetermined rate is ½, if the number of the suitable pixels of the detection straight line segment are eight or more, camera system 1 determines that the start and the end of the selected line segment is treated as the candidate lane-defining-line points. If the number of the suitable pixels of the detection straight line are seven or less, camera system 1 determines that there is no candidate lane-defining-line point.

The above operation of determining the candidate lane-defining-line points is executed by each candidate lane-defining-line search area. For example, in case that the number of the lane-defining-line search areas is set at 10 constituted by 5 search areas for the right lane defining line and 5 search areas for the left lane defining line, the above operation is executed by each of 10 lane-defining-line search areas.

In determining the candidate lane-defining-line points, the predetermined rate may be set at a constant rate throughout all search areas or may be varied by each search area. Further the predetermined value of the density may be set at a constant value throughout all search areas or may be varied by each search area.

At step S6 camera system 1 checks whether the number of the candidate lane-defining-line points of the whole candidate lane-defining-line search area is greater than or equal to a predetermined value agreeable to deciding as a lane defining line. When the number of the candidate lane-defining-line points is smaller than the predetermined value, camera system 1 determines that there is no lane defining line in the search areas, and the routine of this flowchart returns to step S2 to again initialize the size of the search area. When the number of the candidate lane-marker points is greater than or equal to the predetermined value, the routine proceeds to step S7.

At step S7 camera system 1 calculates an offset quantity between the determined candidate lane-defining-line point and a point on the model lane defining line obtained by the previous processing by each candidate lane-defining-line point.

At step S8 camera system 1 calculates fluctuation quantities $\Delta a$, $\Delta b$, $\Delta c$, $\Delta d$ and $\Delta e$ of the road parameters a through e. The calculation of the fluctuation quantities $\Delta a$ through $\Delta e$ may be executed on the basis of a least-square method, for example, disclosed in Japanese Published Patent Application No. 8-5388.

At step S9 camera system 1 corrects road parameters a to e on the basis of fluctuation quantities $\Delta a$ to $\Delta e$ calculated at step S8. When the model lane defining line expressed by the equation (1) is employed, the correction of the fluctuation quantities is executed using the following expressions (10).

$$a=a+\Delta a,\ b=b+\Delta b,\ c=c+\Delta c,\ d=d+\Delta d,\ e=e+\Delta e \quad (10)$$

The corrected road parameters a through e are stored in a predetermined memory area of camera system 1 as a road parameters of a new model lane-defining-line. Further, the corrected road parameters a through e are converted into actual physical quantities using the expressions (9) and stored the obtained physical quantities in the memory area of camera system 1. Subsequent to the execution of step S9, the routine returns to step S3 to repeat the above mentioned routine.

Camera system 1 executes the above-discussed processing and outputs road parameters a through e of the model lane defining lines to controller 2. Controller 2 executes a traveling condition monitor processing for generating alarm according to the traveling condition of vehicle 10, on the basis of road parameters a through e.

There is briefly explained the calculation for obtaining the above-discussed road parameters a through e, although the detailed explanation is made in Japanese Published Patent Application No. 8-5388.

Figure 9:
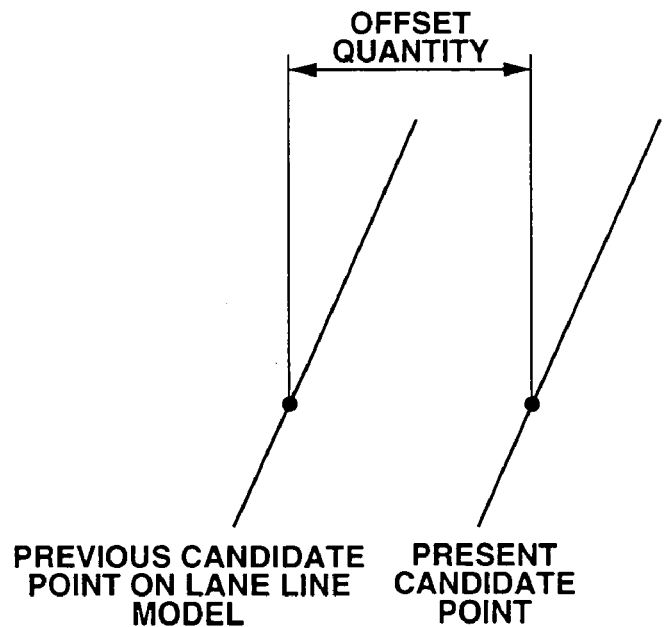
FIG. 9 is a view explaining an offset quantity between a previous candidate point and a present candidate point on a lane line model.

First it is assumed that a road structure on the road image smoothly varies with respect to a time-axis. FIG. 9 shows a change of a line defining line between a previous moment and a present moment. For example, camera system 1 takes (picks up) a road surface image at predetermined intervals such as an interval ranging from 50 to 100 msec., and extracts a part of a lane defining line (white line) from the road image. Further controller 2 obtains x and y coordinates of the part of the lane defining line (white line) and estimates the road parameters in real time. The estimation of the road parameter is executed by a method of comparing a previous line position obtained from a road image of a previous frame and a present line position of a present frame.

Assuming that fluctuation quantities of the previously obtained road parameters a through e are $\Delta a$ through $\Delta e$, a small fluctuation of the j-th point $x_{ij}$ of the i-th lane-defining-line on the road image (x, y) is expressed by the following expression (11) based on Taylor's theorem and by neglecting second-order and more-order terms.

$$\Delta x_{ij}=A'_{ij}\Delta a+B'_{ij}\Delta b+C'_{ij}\Delta c+D'_{ij}\Delta d+E'_{ij}\Delta e \quad (11)$$

where $A'_{ij}=\partial x_{ij}/\partial a$, $B'_{ij}=\partial x_{ij}/\partial b$, $C'_{ij}=\partial x_{ij}/\partial c$, $D'_{ij}=\partial_{ij}/\partial d$, $E'_{ij}=\partial x_{ij}/\partial e$, and where a subscript i takes 0 or 1, and a subscript j is an integer for distinguishing the detected lane-defining-line candidate points. When i=0 denotes a right lane defining line and i=1 denotes a left lane defining line, x coordinates of lane-defining-line candidate points are represented by the expressions (1) and (2), and therefore the expressions (1) and (2) are commonly expressed by the following expressions (11) and (12).

$$x_{0j}=\{a-0.5e\}(y_{0j}-d)+b/(y_{0j}-d)+c \quad (12)$$

$$x_{1j}=\{a+0.5e\}(y_{1j}-d)+b/(y_{1j}-d)+c \quad (13)$$

where subscript i may not limited to two values (0 and 1), and may take an integer ranging from 0 to 3 when the system can detect a lane defining line of the adjacent lane, so that the setting can be changed according to the detected lane defining line.

The estimation of fluctuation quantities $\Delta a$ through $\Delta e$ is executed using a method of least squares. First at the j-th point of the i-th lane defining line on the road image (x, y), an error between the previous line position obtained from a road image of a previous frame and a present line position of a present frame is represented by the following expressions (14).

When a line candidate point is detected, $K_{ij}=x_{newij}-x_{oldij}$

When a line candidate point is not detected, $K_{ij}=0$ \quad (14)

where a subscript new of x means that a value of $x_{ij}$ is a present value, and a subscript old of x means that a value of $x_{ij}$ is a previous value of the previous frame before the present frame.

The following expression (15) is defined as an error performance function.

$$J_{total} = J_{model} + J_{smooth} \tag{15}$$

where $J_{model}$ and $J_{smooth}$ are represented by the following expressions (16) and (17).

$$J_{model} = \sum_{j=1}^{n} p_j \{\Delta x_{0j} - K_{0j}\}^2 + \sum_{j=1}^{n} p_j \{\Delta x_{1j} - K_{1j}\}^2 \tag{16}$$

$$J_{smooth} = S_{\Delta a} \Delta a^2 + S_{\Delta b} \Delta b^2 + S_{\Delta c} \Delta c^2 + S_{\Delta d} \Delta d^2 + S_{66\,e} \Delta e^2 \tag{17}$$

where an integer n is set as an upper limit of the number of lane-defining-line candidate points for one lane defining line.

The expression (16) is an error performance function defined by a difference between a previously detected result $x_{ij-1}$ and a newly detected result $x_{ij}$, and $P_{ij}$ in the expression (16) represents a degree of certainty of the lane-defining-line candidate point. The expression (17) is an error performance function which represents an assumption that the parameters smoothly vary along the time-axis, and S denotes a weight coefficient.

All elements of the error performance function $J_{total}$ represented by the expression (15) have the minimum values, respectively, and are represented by monotonously increasing function as the error increases. Therefore, by obtaining extremes of the function $J_{total}$, fluctuation quantities $\Delta a$ through $\Delta e$ are obtained. That is, the fluctuation quantities $\Delta a$ through $\Delta e$ are obtained by solving the following equation (18).

$$\left[\frac{\partial J_{total}}{\partial \Delta a} \frac{\partial J_{total}}{\partial \Delta a} \frac{\partial J_{total}}{\partial \Delta a} \frac{\partial J_{total}}{\partial \Delta a} \frac{\partial J_{total}}{\partial \Delta a}\right]^T = [0\ 0\ 0\ 0\ 0]^T \tag{18}$$

All of partial differentials of the error performance function in the equation (18) is expressed by the following expressions (19a) through (19e).

$$\frac{\partial J_{total}}{\partial \Delta a} = \frac{\partial J_{model}}{\partial \Delta a} + \frac{\partial J_{smooth}}{\partial \Delta a} \tag{19a}$$

$$= 2\sum_{j=1}^{n} p_j \{\Delta x_{0j} - K_{0j}\}\frac{\partial \Delta x_{0j}}{\partial \Delta a} +$$

$$2\sum_{j=1}^{n} p_j \{\Delta x_{1j} - K_{1j}\}\frac{\partial \Delta x_{1j}}{\partial \Delta a} + 2S_{\Delta a}\Delta a$$

$$= 2\left\{\sum_{j=1}^{n} p_j A'_{0j}\{\Delta x_{0j} - K_{0j}\} + \sum_{j=1}^{n} p_j A'_{1j}\{\Delta x_{1j} - K_{1j}\} + 2S_{\Delta a}\Delta a\right\}$$

$$\frac{\partial J_{total}}{\partial \Delta b} = 2\left\{\sum_{j=1}^{n} p_j B'_{0j}\{\Delta x_{0j} - K_{0j}\} + \sum_{j=1}^{n} p_j B'_{1j}\{\Delta x_{1j} - K_{1j}\} + 2S_{\Delta b}\Delta b\right\} \tag{19b}$$

$$\frac{\partial J_{total}}{\partial \Delta c} = 2\left\{\sum_{j=1}^{n} p_j C'_{0j}\{\Delta x_{0j} - K_{0j}\} + \sum_{j=1}^{n} p_j C'_{1j}\{\Delta x_{1j} - K_{1j}\} + 2S_{\Delta c}\Delta c\right\} \tag{19c}$$

$$\frac{\partial J_{total}}{\partial \Delta d} = 2\left\{\sum_{j=1}^{n} p_j D'_{0j}\{\Delta x_{0j} - K_{0j}\} + \sum_{j=1}^{n} p_j D'_{1j}\{\Delta x_{1j} - K_{1j}\} + 2S_{\Delta d}\Delta d\right\} \tag{19d}$$

$$\frac{\partial J_{total}}{\partial \Delta e} = 2\left\{\sum_{j=1}^{n} p_j E'_{0j}\{\Delta x_{0j} - K_{0j}\} + \sum_{j=1}^{n} p_j E'_{1j}\{\Delta x_{1j} - K_{1j}\} + 2S_{\Delta e}\Delta e\right\} \tag{19e}$$

By simultaneously solving the expressions (19a) through (19e) and by expressing the determinant of the equation (18) in the form of a formula, the following expression (20) is obtained.

$$\{S_W + S_S\}[\Delta a\ \Delta b\ \Delta c\ \Delta d\ \Delta e]^T - S_k = 0 \tag{20}$$

where $S_W$, $S_K$ and $S_S$ are column vectors and are respectively expressed by the following expressions (21), (22) and (23).

$$S_W = \sum_{j=1}^{n}\{p_j[A'_{0j}\ B'_{0j}\ C'_{0j}\ D'_{0j}\ E'_{0j}]^T [A'_{0j}\ B'_{0j}\ C'_{0j}\ D'_{0j}\ E'_{0j}]\} + \sum_{j=1}^{n}\{p_j[A'_{1j}\ B'_{1j}\ C'_{1j}\ D'_{1j}\ E'_{1j}]^T [A'_{1j}\ B'_{1j}\ C'_{1j}\ D'_{1j}\ E'_{1j}]\} \tag{21}$$

$$S_k = \sum_{j=1}^{n}\{p_j[A'_{0j}\ B'_{0j}\ C'_{0j}\ D'_{0j}\ E'_{0j}]^T K'_{0j}\} + \sum_{j=1}^{N}\{P_j[A'_{1j}\ B'_{1j}\ C'_{1j}\ D'_{1j}\ E'_{1j}]^T K'_{1j}\} \tag{22}$$

$$S_S = \begin{bmatrix} S_{\Delta a} & 0 & 0 & 0 & 0 \\ 0 & S_{\Delta b} & 0 & 0 & 0 \\ 0 & 0 & S_{\Delta c} & 0 & 0 \\ 0 & 0 & 0 & S_{\Delta d} & 0 \\ 0 & 0 & 0 & 0 & S_{\Delta e} \end{bmatrix} \tag{23}$$

The fluctuation quantities $\Delta a$ through $\Delta e$, which satisfy the expression (20), is obtained using the following expression (24) only when the sum of the expressions (21) and (22) has an inverse matrix.

$$[\Delta a \Delta b \Delta c \Delta d \Delta e]^T = (S_W + S_S)^{-1} S_k \tag{24}$$

Thus, the road parameters a through e are updated by correcting road parameters e through e using fluctuation quantities Δa through Δe obtained by the above-discussed manner. Although the embodiment has been explained such that the road parameters a through e are corrected using the method of least squares, a parameter estimating means adaptable to a non-linear system, such as an extended Kalman filter.

Figure 10:
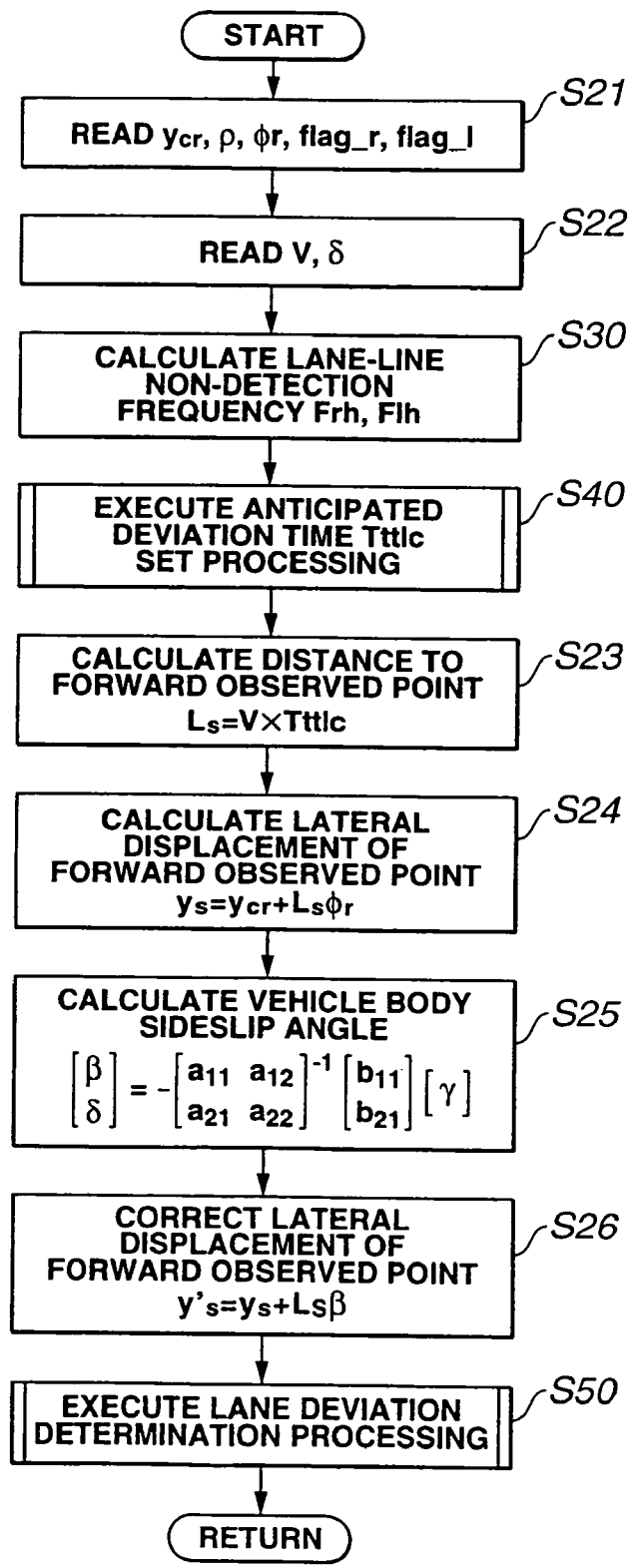
FIG. 10 is a flowchart showing a procedure of a traveling condition monitor processing executed by a controller of the lane deviation alarm system according to the first embodiment of the present invention.

Subsequently, there is explained a traveling condition monitor processing executed by controller 2. FIG. 10 shows a procedure of the traveling monitor processing.

At step S21 controller 2 reads road parameters $y_{cv}$, $\rho$ and $\phi_r$ of the model lane defining line, which have been stored as new road parameters of the model lane defining line. Further controller 2 read a right line non-detection flag flag_r and a left line non-detection flag flag_l. Right line non-detection flag flag_r is a flag indicative that camera system 1 detects a right lane defining line. When the right lane defining line is detected, right line non-detection flag flag_r is set at 1 (flag_r=1). When the right lane defining line is not detected, right line non-detection flag flag_r is set at 0 (flag_r=0). Similarly, when the left lane defining line is detected, left line undetected flag flag_l is set at 1 (flag_l=1). When the left lane defining line is not detected, left line non-detection flag flag_l is set at 0 (flag_l=0).

At step S22 controller 2 reads vehicle traveling condition data. Herein, the vehicle traveling condition data comprises a vehicle speed V detected by vehicle speed sensor 4, a present steering angle θ of the steering wheel, which is detected by steering angle sensor 5.

Figure 11:
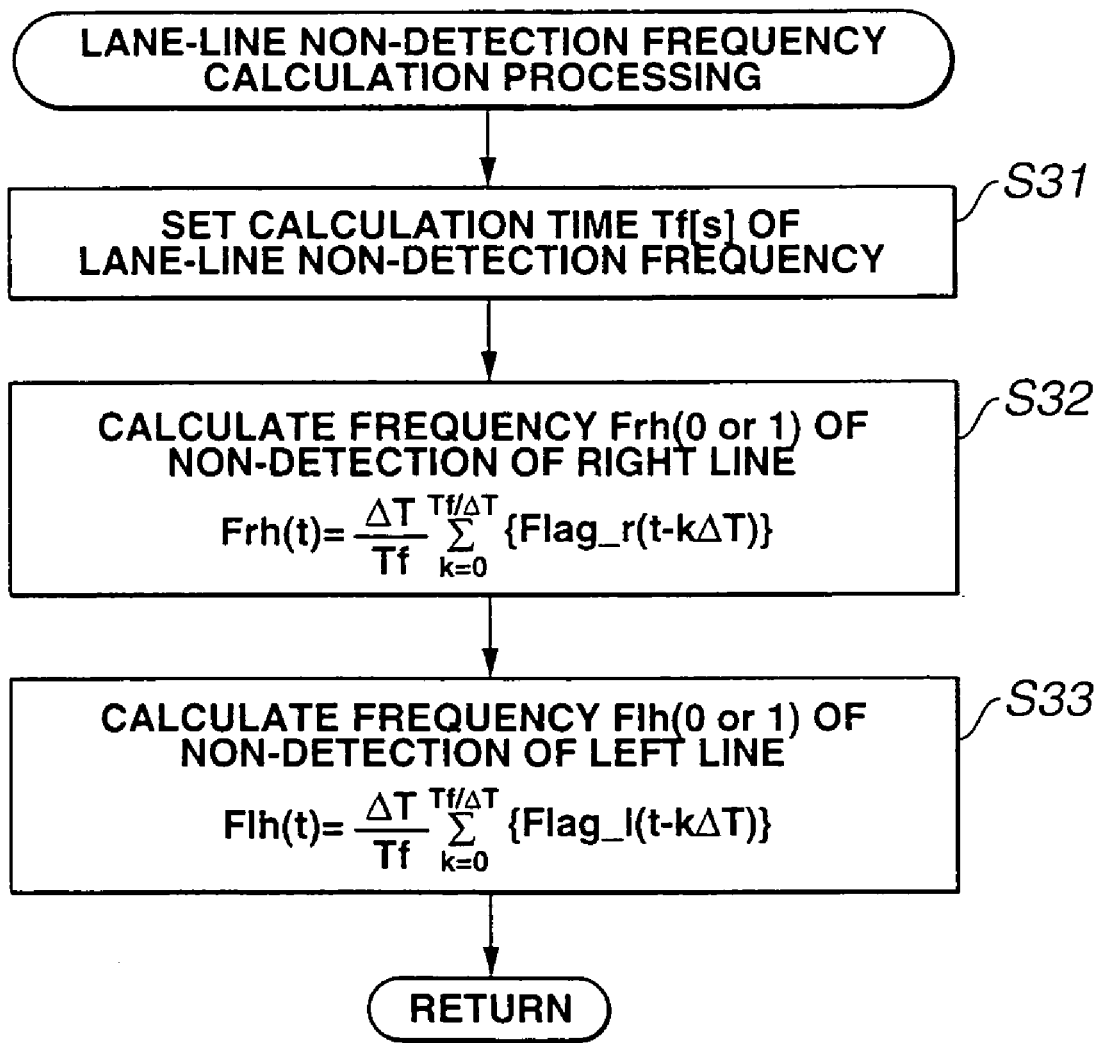
FIG. 11 is a flowchart showing a procedure of a line non-detection frequency calculation processing executed by the controller.

At step S30 controller 2 executes a calculation processing of the lane-defining-line non-detection frequencies. FIG. 11 shows a procedure of the lane-defining-line non-detection frequency calculation processing.

At step S31 in FIG. 11, controller 2 sets a frequency calculation time $T_f$ (sec.) employed in the lane-defining-line non-detection frequency calculation.

At step S32 controller 2 calculates a right line non-detection frequency Frh. More specifically, controller 2 reads right line non-detection flag flag_r obtained during a period from a present moment to the past frequency calculation time $T_f$.

The right line non-detection frequency Frh during the period from a present moment to the past frequency calculation time $T_f$ is calculated using right line non-detection flag flag_r, by means of a moving average processing during the predetermined time period (the period from a present moment to the past frequency calculation time $T_f$). Right line non-detection frequency Frh is a frequency of not capable of detecting the right lane defining line during the period from the present moment to the past frequency calculation time $T_f$. Herein, when a calculation sampling time is ΔT, right line non-detection frequency Frh(t) is obtained by the following expression (25) representative of the moving average processing.

$$Frh(t) = \frac{\Delta t}{Tf} \sum_{k=0}^{Tf/\Delta T} \{\text{flag\_r}(t - k\Delta T)\} \quad (25)$$

At step S33 controller 2 calculates a left line non-detection frequency Flh. More specifically, controller 2 reads left line non-detection flag flag_l obtained during a period from a present moment to the past frequency calculation time $T_f$.

The left line non-detection frequency Flh during the period from a present moment to the past frequency calculation time $T_f$ is calculated using left line non-detection flag flag_l, by means of the moving average processing during the predetermined time period (the period from a present moment to the past frequency calculation time $T_f$). Left line non-detection frequency Flh is a frequency of not capable of detecting the left lane defining line during the period from the present moment to the past frequency calculation time $T_f$. Herein, when a calculation sampling time is ΔT, left line non-detection frequency Flh(t) is obtained by the following expression (26) representative of the moving average processing.

$$Flh(t) = \frac{\Delta T}{Tf} \sum_{k=0}^{Tf/\Delta T} \{\text{flag\_l}(t - k\Delta T)\} \quad (26)$$

The processing from steps S31 through S33 is executed at step S30, and the main routine in FIG. 10 then proceeds to step S40.

At step S40 controller 2 executes a set processing of a anticipated deviation time Tttlc of traveling vehicle 10. Anticipated deviation time Tttlc is a time period from a present moment to an anticipated deviation moment on the basis of a present vehicle traveling condition (lateral displacement and yaw angle of vehicle 10 relative to a traveling lane). Herein, a lane deviation is defined as a condition that a front wheel of vehicle 10 crosses with a lane defining line of the traveling lane so that vehicle 10 deviates from a traveling lane.

Anticipated deviation time Tttlc is set as a parameter for defining an alarm timing. By using anticipated deviation time Tttlc as an alarm timing, alarm is generated when the lane deviation is generated after anticipated deviation time Tttlc elapsed. Therefore, it becomes possible to timely generate the alarm as to the lane deviation.

For example, when it is possible to complete a proper lane-deviation avoidance operation within 1.0 second after a driver is aware of the alarm, anticipated deviation time Tttlc is set at 1.0 second. With this arrangement, it becomes possible for the driver to properly complete the lane-deviation avoidance by executing the lane-deviation avoidance operation after being aware of the alarm. There is explained a setting of anticipated deviation time Tttlc with reference to FIG. 12.

At step S41 controller 2 determines whether or not right line non-detection frequency Frh(t) obtained at step S32 is greater than left line non-detection frequency Flh(t) obtained at step S33. When the determination at step S41 is affirmative (Frh(t)>Flh(t)), the program proceeds to step S42. When the determination at step S41 is negative (Frh(t)≦Flh(t)), the program proceeds to step S43.

At step S42 controller 2 calculates anticipated deviation time Tttlc using the following expressions (27).

When $Frh(t) < Flo$, $Tttlc = Tttlc1$.

When $Flo \leq Frh(t) < Fhi$, $Tttlc = Tttlc1 \cdot ((Fhi - Frh(t))/(Fhi - Flo))$.

When $Fhi \leq Frh(t)$, $Tttlc = 0$ $\quad (27)$ where Tttlc1 is a fixed value which is greater than 0, Flo is a minimum frequency, and Fhi is a maximum frequency. As is apparent from the expressions (27), when right line non-detection frequency Frh(t) is smaller than minimum frequency Flo, anticipated deviation time Tttlc is set a fixed value Tttlc1. When right line non-detection frequency Frh(t) is greater than or equal to minimum frequency Flo and is smaller than maximum frequency Fhi, anticipated deviation time Tttlc is set according to right line non-detection frequency Frh(t). When right line non-detection frequency Frh(t) is greater than maximum frequency Flo, anticipated deviation time Tttlc is set at 0.

At step S43 controller 2 calculates anticipated deviation time Tttlc using the following expressions (28).

When $Flh(t) < Flo$, $Tttlc = Tttlc1$.

When $Flo \leq Flh(t) < Fhi$, $Tttlc = Tttlc1 \cdot ((Fhi - Flh(t))/(Fhi - Flo))$.

When $Fhi \leq Flh(t)$, $Tttlc = 0$ \hfill (28)

where Tttlc1 is a fixed value which is greater than 0, Flo is a minimum frequency, and Fhi is a maximum frequency, as discussed above.

As is apparent from the expressions (28), when left line non-detection frequency Flh(t) is smaller than minimum frequency Flo, anticipated deviation time Tttlc is set a fixed value Tttlc1. When left line non-detection frequency Flh(t) is greater than or equal to minimum frequency Flo and is smaller than maximum frequency Fhi, anticipated deviation time Tttlc is set according to left line non-detection frequency Flh(t). When right line non-detection frequency Frh(t) is greater than maximum frequency Flo, anticipated deviation time Tttlc is set at 0.

As discussed above, controller 2 determines the presence or absence of lane-defining-lines, on the basis of the lane-defining-line candidate points defining a boundary of the picked-up image. And the detection result of the presence or absence of the line defining lines are right line non-detection frequency Frh(t) and left line non-detection frequency Flh(t). At step S40 controller 2 sets anticipated deviation time Tttlc on the basis of right line non-detection frequency Frh(t) and left line non-detection frequency Flh(t). Therefore, anticipated deviation time Tttlc is set on the basis of the lane-defining-line candidate points in the picked-up image.

The routine in FIG. 10 proceeds to step S23 after anticipated deviation time Tttlc is set on the basis of right and left line non-detection frequencies Frh(t) and Flh(t) through the execution of the anticipated deviation time processing at step S40. Herein, although anticipated deviation time Tttlc is represented by a first-order function of right line non-detection frequency Frh(t) or left line non-detection frequency Flh(t) using the expressions (27) or (28), the invention is not limited to this arrangement. Anticipated deviation time Tttlc may not be represented by the first-order function of right line non-detection frequency Frh(t) or left line non-detection frequency Flh(t), and may be arranged to monotonously decrease as right line non-detection frequency Frh(t) or left line non-detection frequency Flh(t) increases.

At step S23 controller 2 calculates forward-observed-point distance $L_s$ from the following expression (29) using anticipated deviation time Tttlc set at step S40.

$$L_S = V \times Tttlc \hfill (29)$$

At step S24 controller 2 calculates forward-observed-point lateral displacement estimated value $y_s$ at a position of forward-observed-point distance Ls from the following expression (30).

$$Y_s = y_{cr} + L_s \phi_r = y_{cr} + (V \times Tttlc) \phi_r \hfill (30)$$

where forward-observed-point lateral displacement estimated value $y_s$ means a lateral displacement of vehicle 10 from a center of traveling lane at a position of forward-observed-point distance $L_s$. Since forward-observed-point distance $L_s$ obtained at step S23 is a product of vehicle speed and anticipated deviation time Tttlc, forward-observed-point lateral-displacement estimated value $y_s$ represents a lateral distance (anticipated distance) which vehicle 10 travels during a period from a present moment to a moment when anticipated deviation time Tttlc elapsed. For example, when the traveling road is generally straight, the magnitude of forward-observed-point lateral-displacement estimated value $y_s$ directly represents a lane deviation tendency of vehicle 10. However, when the traveling road is a curve, this concept cannot be adapted directly. Accordingly, when the traveling road is a curve, controller 2 determines the lane deviation tendency from the following concept. That is, controller 2 determines the lane deviation tendency on a curved road by correcting a vehicle body sideslip angle β(offset between the direction of the vehicle body and the traveling direction of vehicle 10).

FIGS. 14A and 14B show views for explaining a reason for taking account of vehicle body sideslip angle β. Both of FIGS. 14A and 14B show a situation that vehicle travels a curved road while finely traces a center of a traveling lane. Vehicle 10 shown in FIG. 14B travels at a vehicle speed higher than that of vehicle 10 shown in FIG. 14A. Although the vehicle speed of vehicle shown in FIG. 14A is different from that of vehicle shown in FIG. 14B, both vehicles are put in a constant turn condition so as to finely trace a center of the traveling lane. This means that both vehicles are put in an ideal traveling state in the meaning of avoiding a lane-deviation. Therefore, in view of the lane deviation tendency, both traveling conditions of vehicles shown in FIGS. 14A and 14B should be evaluated to be equivalent. For example, a vehicle having a general under-steer characteristic generates and increases vehicle body sideslip angle at a turn inner side as the vehicle speed increases.

Figure 16:
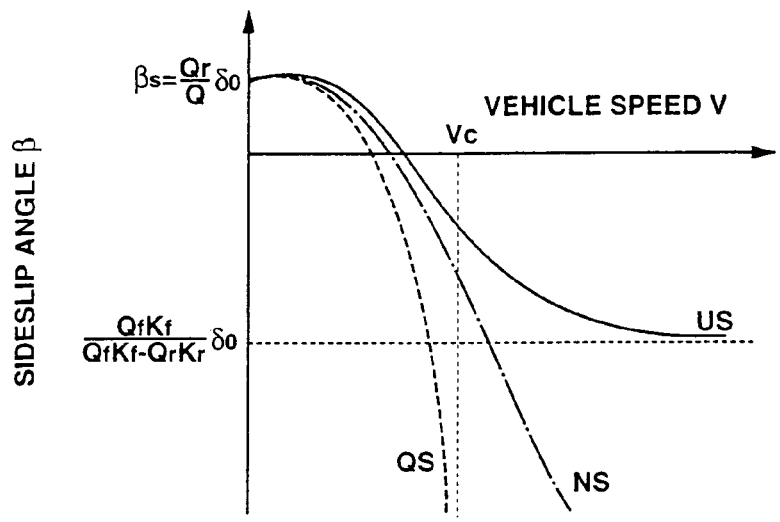
FIG. 16 is a graph showing a relationship between a sideslip angle at a center of gravity of the vehicle and the vehicle speed.

That is, as shown in FIG. 15, when a vehicle having a neutral steer characteristic turns at a constant steering angle, a turn angular speed linearly increases as the vehicle speed increases. When a vehicle having an under-steer characteristic (US characteristic in FIG. 15) turns at a constant steering angle, the turn angular speed increases to a predetermined speed as the vehicle speed increases. That is, the turn angular speed does not become greater than the predetermined speed. However, an absolute value of sideslip angle β at a center of gravity of vehicle 10 increases in proportion to a square of the vehicle speed as shown in FIG. 16. Thus, sideslip angle β at a center of gravity of vehicle 10 varies according to the vehicle speed regardless of the steer characteristic of vehicle, and the reason thereof is that the vehicle has to obtain a lateral force balanced with a centrifugal force according to the vehicle speed.

Sideslip angle β at a center of gravity of vehicle 10 is an angle between a fore-and-aft direction of vehicle and a traveling direction of a center of gravity of vehicle. More specifically, sideslip angle β corresponds to an angle of a tangential direction of a turn circle and represents an attitude of vehicle 10 with respect to a turn circle in a steady circular turn. A fact that this sideslip angle takes a negative value and increases its absolute value as vehicle speed increases represents that the vehicle increases a tendency of executing a circle turn while directing a vehicle head toward an inner side of the turn circle as the vehicle speed increases. A detailed explanation of the above discussed vehicle behaviors is disclosed in "VEHICLE DYNAMICS AND CONTROL (third edition)", Masato Abe, published on May 31, 1996, pages 60–70.

When there is a difference between the vehicle speeds of the vehicles shown in FIGS. 14A and 14B such that the vehicle speed of the vehicle shown in FIG. 14A is 50–60 km/h and the vehicle speed of the vehicle shown in FIG. 14B is 100 km/h, the meaning of forward-observed-point lateral-displacement estimated value $y_s$ becomes different therebetween. Therefore, at step S25 controller 2 estimates vehicle body sideslip angle β from a vehicle model identification value, vehicle speed V, actual steering angle δ and road curvature ρ, using the following expression (31).

$$\begin{bmatrix} \beta \\ \delta \end{bmatrix} = -\begin{bmatrix} a_{11} & a_{12} \\ a_{21} & a_{22} \end{bmatrix}^{-1} \begin{bmatrix} b_{11} \\ b_{21} \end{bmatrix} [\gamma] \quad (31)$$

where $$a_{11} = \frac{C_f + C_r}{mV}, a_{12} = -\frac{C_f}{mV}, a_{21} = \frac{l_f C_f + l_r C_r}{I}, a_{22} = -\frac{l_f C_f}{I},$$

$$b_{11} = \frac{l_r C_r - l_f C_f}{mV^2} - 1, b_{21} = \frac{l_r^2 C_r - l_f^2 C_f}{IV},$$

and $\gamma = V_p$. Further, I is a vehicle-body yaw inertia moment, m is a vehicle weight, $l_f$ is a distance between a center of gravity and a front wheel, $l_r$ is a distance between the center of gravity and a rear wheel, $C_f$ is a front-wheel cornering power for 2 wheels, $C_r$ is a rear-wheel cornering power for 2 wheels, V is the vehicle speed, γ is a yaw rate, δ is a front-wheel actual steering angle, β is the sideslip angle and ρ is the road curvature.

At step S26 controller 2 corrects forward-observed-point lateral-displacement estimated value $y_s$ using vehicle body sideslip angle β. More specifically, controller 2 sets a product of forward-observed-point distance $L_s$ and vehicle body sideslip angle δ ($L_s \times \beta$) as a correction value of forward-observed-point lateral-displacement estimated value, and sets forward-observed-point lateral-displacement estimated value (lane deviation evaluation point) $y'_s$ of the correction value from the following expression (32) using the correction value ($L_s \times \beta$).

$$y'_s = y_s + L_s \beta \quad (32)$$

The expression (32) expresses that corrected forward-observed-point lateral-displacement estimated value $y'_s$ is varied from pre-correction forward-observed-point lateral-displacement estimated value $y_s$ by a correction quantity ($L_s \times \beta$).

At step S50 controller 2 determines whether or not host vehicle 10 is in a condition of the lane deviation tendency, by comparing the corrected forward-observed-point lateral-displacement estimated value $y'_s$ with predetermined thresholds Yth_r and Yth_l.

Figure 17:
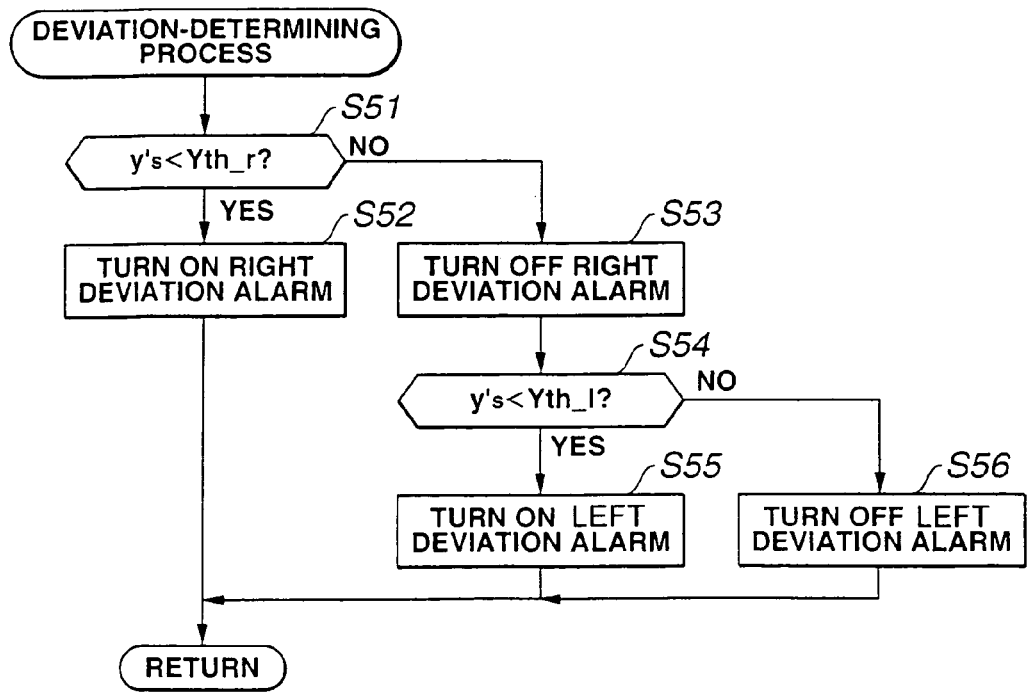
FIG. 17 is a flowchart showing a procedure of a lane deviation determination processing executed by the controller.

FIG. 17 shows a procedure of a lane deviation determination processing.

At step S51 controller 2 determines whether or not host vehicle 10 is in a lane deviation tendency toward a right adjacent lane, by comparing the corrected forward-observed-point lateral-displacement estimated value $y'_s$ with predetermined threshold Yth_r. Right deviation determination threshold Yth_r is, for example, set at a predetermined fixed value Yth1. More specifically, controller 2 determines whether corrected forward-observed-point lateral-displacement estimated value $y'_s$ is smaller than right deviation determination threshold Yth_r. Herein, right deviation determination threshold Yth_r is a value which has been previously obtained as a result of experiments. For example, right deviation determination threshold Yth_r is a fixed value. When the determination at step S51 is affirmative, that is, when corrected forward-observed-point lateral-displacement estimated value $y'_s$ is smaller than right deviation determination threshold Yth_r ($y'_s <$Yth_r), controller 2 determines that the vehicle is in the lane deviation tendency toward the right adjacent lane, and the program proceeds to step S52. When the determination at step S51 is negative, that is, when corrected forward-observed-point lateral-displacement estimated value $y'_s$ is greater than or equal to right deviation determination threshold Yth_r ($y'_s \geq$Yth_r), controller 2 determines that the vehicle is not in the lane deviation tendency toward the right adjacent lane, and the program proceeds to step S53.

At step S52 controller 2 generates a right deviation alarm command, and the program of FIG. 17 is then terminated. At step S53 controller 2 stops the right deviation alarm command, and the program then proceeds to step S54.

At step S54 controller 2 determines whether or not host vehicle 10 is in a lane deviation tendency toward a left adjacent lane, by comparing the corrected forward-observed-point lateral-displacement estimated value $y'_s$ with predetermined threshold Yth_l. Left deviation determination threshold Yth_l is, for example, set at a predetermined fixed value Yth1. More specifically, controller 2 determines whether corrected forward-observed-point lateral-displacement estimated value $y'_s$ is smaller than left deviation determination threshold Yth_l. Herein, left deviation determination threshold Yth_l is a value which has been previously obtained as a result of experiments. For example, left deviation determination threshold Yth_l is a fixed value. When the determination at step S54 is affirmative, that is, when corrected forward-observed-point lateral-displacement estimated value $y'_s$ is smaller than left deviation determination threshold Yth_l ($y'_s <$Yth_l), controller 2 determines that the vehicle is in the lane deviation tendency toward the left adjacent lane, and the program proceeds to step S55. When the determination at step S54 is negative, that is, when corrected forward-observed-point lateral-displacement estimated value $y'_s$ is greater than or equal to left deviation determination threshold Yth_l ($y'_s \geq$Yth_l), controller 2 determines that vehicle 10 is not in the lane deviation tendency toward the left adjacent lane, and the program proceeds to step S56.

At step S55 controller 2 generates a left deviation alarm command, and the program of FIG. 17 is then terminated. At step S56 controller 2 stops the left deviation alarm command, and the program of FIG. 17 is then terminated.

Subsequently, there is discussed a function and operation of the traveling condition monitor processing with reference to timing charts shown in FIGS. 18A through 18H.

Figure 18A:
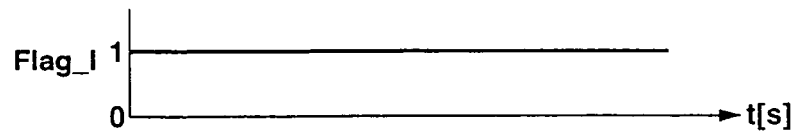
FIGS. 18A through 18H are timing charts explaining the operations of the lane deviation alarm system of the first embodiment according to the present invention.
Figure 18B:

FIG. 18A shows a change of left line non-detection flag flag_l indicative of a left lane-defining-line detection condition picked up by camera system 1. FIG. 18B shows a change of right line non-detection flag flag_r indicative of a right lane-defining line detection condition picked up by camera system 1.

In this embodiment, it is assumed that the detection and the non-detection of the right lane-defining-line is repeated as shown in FIG. 18B. Under this condition, right line non-detection flag flag_r fluctuates between 0 and 1 within a short time.

Figure 18C:
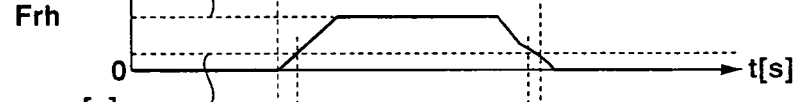

In the lane-defining-line non-detection frequency calculation processing executed at step S30, right lane-definingline non-detection frequency Frh, which is calculated by the moving average processing of right lane-defining-line non-detection flag flag_r during the predetermined time period, is varied as shown in FIG. 18C. In this embodiment, right line non-detection frequency Frh increases from 0 when right line non-detection flag flag_r starts to fluctuate between 0 and 1. When a predetermined time period elapsed from the start of a fluctuation of right line non-detection flag flag_r fluctuated between 0 and 1, right line non-detection frequency Frh reaches maximum frequency Fhi, and thereafter the fluctuation of right line non-detection flag flag_r between 0 and 1 is terminated, and right line non-detection frequency Frh decreases.

Figure 18D:
Figure 18E:

In the anticipated deviation time setting processing executed at step S40, controller 2 sets anticipated deviation time Tttlc on the basis of right or left non-detection frequency Frh or Flh. In this embodiment, since right line non-detection frequency Frh is higher than left line non-detection frequency Flh, controller 2 sets anticipated deviation time Tttlc on the basis of right line non-detection frequency Frh. Since anticipated deviation time Tttlc is calculated so as to be in proportion to right line non-detection frequency Frh as is apparent from the expression (27), anticipated deviation time Tttlc varies as shown in FIG. 18D. More specifically, anticipated deviation time Tttlc starts to decrease from fixed value Tttlc1 which is an initial value as right line non-detection frequency Frh increases. When right line non-detection frequency Frh reaches the maximum frequency Fhi, Tttlc1 takes 0. Thereafter, Tttlc1 increases as right line non-detection frequency Frh decreases.

In the forward-observed-point distance calculation processing executed at step S23, controller 2 calculates forward-observed-point distance $L_s$ from the expression (29). In the forward-observed-point lateral-displacement calculation processing executed at step S24, controller 2 calculates forward-observed-point lateral-displacement estimated value $y_s$ at the position of forward-observed-point distance $L_s$ using the expression (16). At step S26, controller 2 obtains the corrected forward-observed-point lateral-displacement estimated value $y'_s$ by correcting forward-observed-point lateral-displacement estimated value $y_s$ using forward-observed-point distance $L_s$ and vehicle body sideslip angle $\beta$ from the expression (32).

At step S50 controller 2 determines whether or not host vehicle 10 is in the lane deviation tendency by comparing the corrected forward-observed-point lateral-displacement estimated value $y'_s$ with thresholds yth_r and Yth_l. According to the determination result, controller 2 outputs one of right and left deviation alarm command.

Subsequently, advantages gained by this processing will be discussed. Herein, the vehicle dynamics during a traveling state is considered. The vehicle in the traveling state is always put in a pitching and bouncing state. Pitching is normally generated, for example, when the vehicle is accelerated or decelerated.

Under this situation, vertical disturbances are inputted independently to front and rear wheels. Accordingly, a simple bouncing quantity is relatively stabled (suppressed). However, pitch angle η is represented as an image showing a difference of an intervals of the lane defining line projected on a screen (on CCD), it is correctly recognized as far as both right and left lane defining lines are detected. In other words, when neight of right and left lane defining lines is detected, it is not possible to correctly recognize pitch angle η. As a result, forward observed point lateral displacement $y_s$ is also largely fluctuated. This frequently invites erroneous alarm operations. The reason of generating erroneous alarm operation is owing to the following relationship.

In the interest of simplicity, it is assumed that the traveling road is generally straight having a sufficiently small curvature. Under this condition, the expressions (7) and (8) are represented by the following expressions (33) and (34).

$$x=(y_{cr}+0.5W)(y+f\eta)/h+f\phi_r \quad (33)$$

$$x=(y_{cr}-0.5W)(y+f\eta)/h+f\phi_r \quad (34)$$

where the expression (33) is an expression for the right side direction view as viewed from vehicle, and the expression (34) is an expression for the left side direction view as viewed from vehicle.

Further, gradients k of right and left lane defining lines are represented by the following expressions (35) and (36).

$$k=(x(1)-x(2))/(y(1)-y(2))=(y_{cr}+0.5W)/h \quad (35)$$

$$k=(x(1)-x(2))/(y(1)-y(2))=(y_{cr}-0.5W)/h \quad (36)$$

where the expression (35) is an expression for the right side direction view as viewed from vehicle, and the expression (36) is an expression for the left side direction view as viewed from vehicle.

The expressions represent that the fluctuation of lane width W and camera height h affect the estimation accuracy of lateral displacement $y_{cr}$ of vehicle 10 and that pitch fluctuation does not affect the lateral displacement. Further, these expressions represents that it is possible to calculate the lateral displacement $y_{cr}$ only from one of the lane defining lines when lane width W and camera height h are accurately recognized.

The following expression (37) is obtained from the expressions (33) through (36).

$$x=k(y+f\eta)+f\phi_r,$$

$$k\eta+\phi_r=(x+ky)/f \quad (37)$$

This expression (37) represents that it is possible to accurately calculate pitch angle η and yaw angle $\phi_r$ as long as both lane defining lines are detected and the gradients of the lane defining lines projected on screen are not equal. That is, when a gradient of the right lane defining line projected on the CCD screen is $k_r$ and when a gradient of the left lane defining line projected on the CCD screen is $k_l$, pitch angle η and yaw angle $\phi_r$ are represented by the following expression (38).

$$\begin{bmatrix} \eta \\ \phi_r \end{bmatrix} = \frac{1}{f}\begin{bmatrix} k_r & 1 \\ k_l & 1 \end{bmatrix}^{-1}\begin{bmatrix} X_r & -yk_r \\ X_l & -yk_l \end{bmatrix} \quad (38)$$

where when one of the lane defining lines is not detected, combinations of pitch angle η and yaw angle $\phi_r$ which satisfy the expression (38), are infinite. Therefore, it is impossible to obtain both of pitch angle η and yaw angle $\phi_r$ without knowing one of pitch angle η and yaw angle $\phi_r$.

From the above-discussed relationship, when one of the lane-defining-lines is not detected, lane width W, whose fluctuation is relatively small during the vehicle traveling condition, is fixed at an average of lane width W detected until one of the lane-defining-lines becomes not detected. When the road parameters are estimated on the basis of road width W, the lateral displacement of the vehicle has a relatively small fluctuation. On the other hand, when one of the lane-defining-lines is not detected, pitch angle η may be set at a fixed value. For example, pitch angle η may be fixed or estimated at an average of pitch angle η detected until one of the lane-defining-lines becomes not detected. Although it becomes possible to estimate the road parameters therefrom, when actual pitch angle η largely fluctuates, there causes an error between the actual pitch angle η and the estimated pitch angle η. This error directly generates an error of yaw angle $\phi_r$. That is, when a yaw angle estimated value is $\phi_r$, and a pitch angle error is $\Delta\eta$, yaw angle estimated value $\phi_r$ is represented by the following expression (39) based on the expression (37).

$$\phi_r=(x+ky)/f-k(\eta+\Delta\eta)=\phi_r-k\Delta\eta \qquad (39)$$

When one of the lane-defining-lines is not detected, it is difficult to accurately estimate yaw angle $\phi_r$. However, by employing the concept of the present invention, even when yaw angle $\phi_r$ is estimated and when pitch angle η is largely fluctuated, it becomes possible to suppress the influence of forward-observed-point lateral-displacement $y_s$ on the estimated yaw angle $\phi_r$.

Figure 18F:
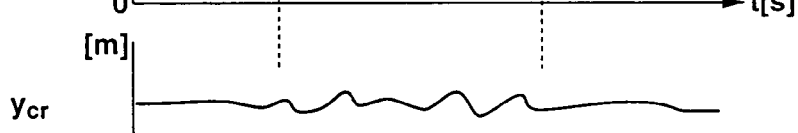
Figure 18G:
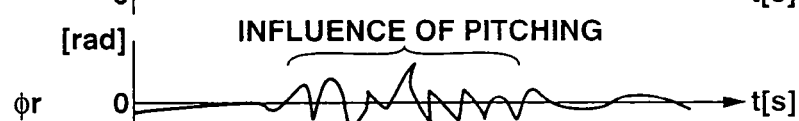
Figure 18H:
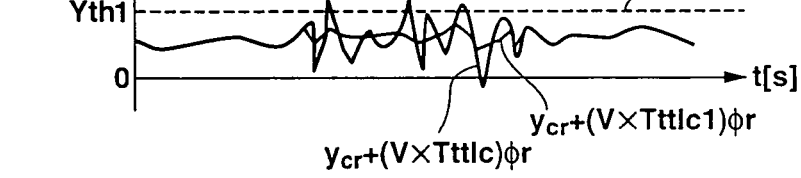

FIGS. 18F and 18G represent changes of lateral displacement estimated value $y_{cr}$ and yaw angle $\phi_r$ in case that one of the lane-defining-lines is not detected. When a pitching of the vehicle is generated under a condition that one of the lane-defining-lines is not detected, yaw angle (yaw angle estimated value) $\phi_r$ becomes fluctuated due to the pitching, as shown in FIG. 18G. Therefore, the fluctuation of forward-observed-point lateral-displacement $y_s$ becomes large as shown in FIG. 18H. As a result, forward-observed-point lateral-displacement $y_s$ also largely fluctuates, and the frequency of the erroneous alarms increases. For example, as shown in FIG. 18H, forward-observed-point lateral-displacement $y_s$ (or corrected forward-observed-point lateral-displacement $y'_s$) unnecessarily becomes greater than right line deviation determination threshold Yth_r (Yth1), and erroneous alarms are generated. The driver feels such an erroneous alarm very noisy.

In contrast to this, by employing the present invention in the control, as shown in step S40, when one of the lane-defining-lines is not detected, that is, when the line non-detection frequency becomes greater than a predetermined value, anticipated deviation time Tttlc for calculating forward-observed-point lateral-displacement $y_s$ at steps S23 and S24, is gradually decreased. That is, as expressed by the expression (30), anticipated deviation time Tttlc for calculating forward-observed-point lateral-displacement $y_s$ as a product of anticipated deviation time Tttlc and yaw angle $\phi_r$ is gradually decreased to a small value.

With this arrangement according to the present invention, it becomes possible to decrease a rate of the yaw angle component, which largely fluctuates when one of the lane-defining-lines is not detected, in forward-observed-point lateral-displacement $y_s$ employed for determining the lane deviation. With this arrangement, even when yaw angle $\phi_r$ is largely fluctuated by pitching and the like under the condition that one of the lane-defining-lines is not detected, it becomes possible to suppress the fluctuation of forward-observed-point lateral-displacement $y_s$, as shown in FIG. 18H. That is, this decreases the frequency of erroneous alarms, and suppresses the driver from having a noisy feeling.

Figure 12:
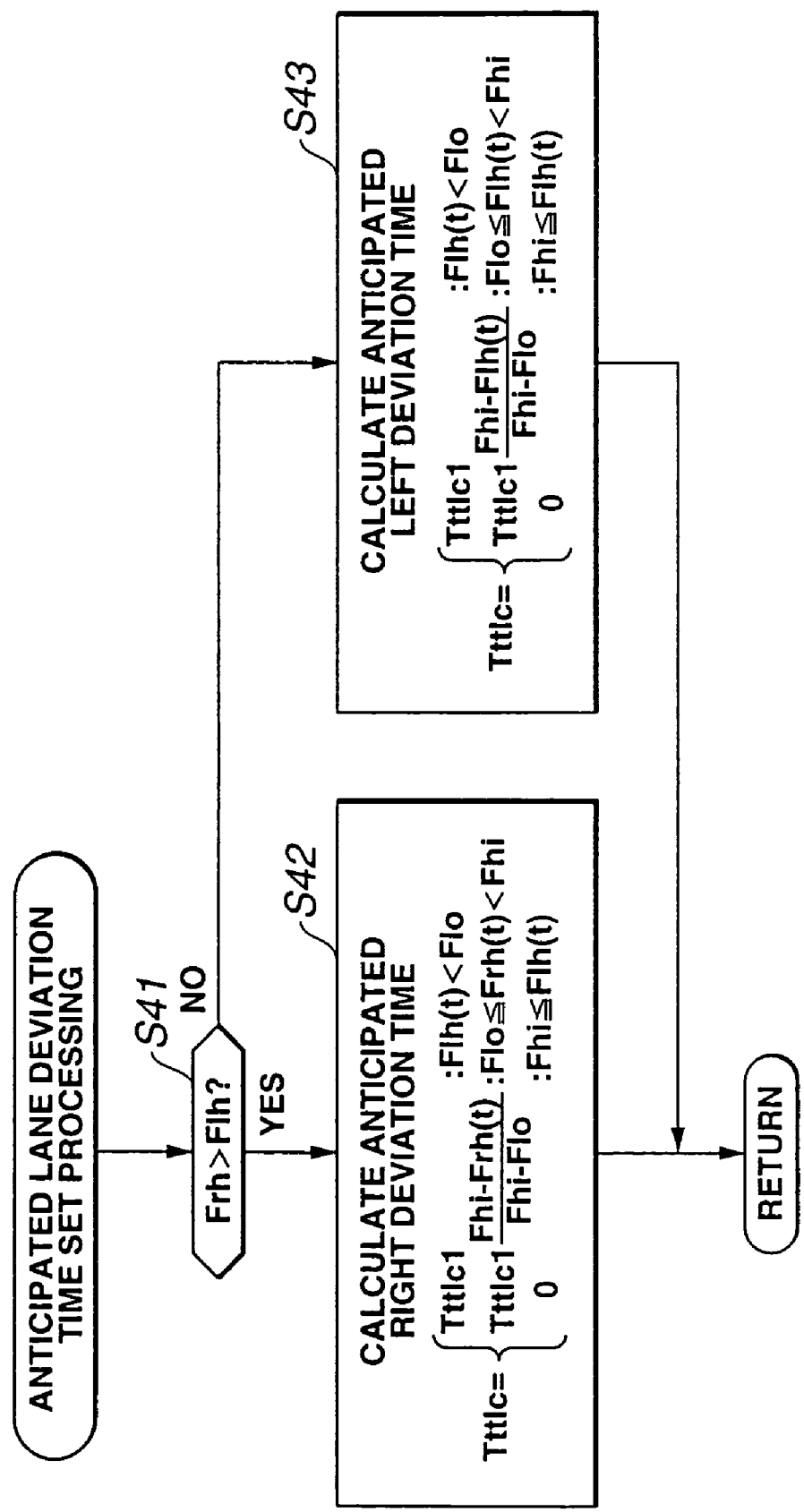
FIG. 12 is a flowchart showing a procedure of an anticipated deviation time set processing executed by the controller.
Figure 13:
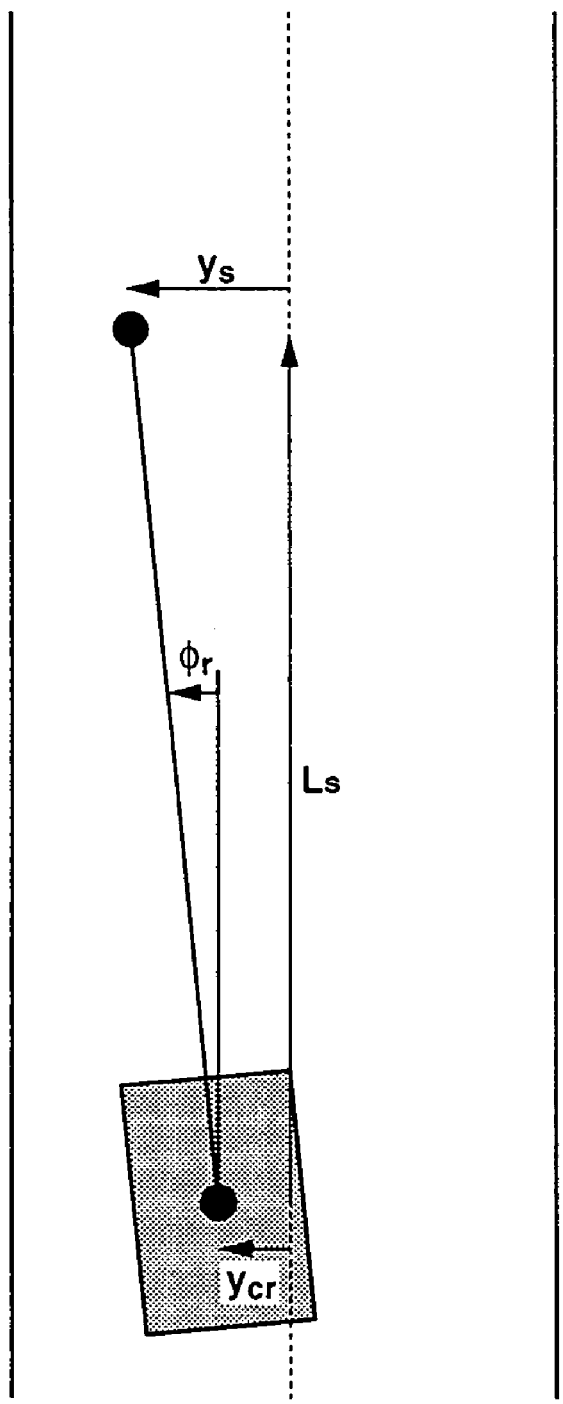
FIG. 13 is a view explaining a forward-observed-point lateral-displacement estimated value $y_s$.

As shown at step S40 in FIG. 12, anticipated deviation time Tttlc is set according to the lane-defining-line non-detection frequency. More specifically, anticipated deviation Tttlc is decreased as the lane-defining-line non-detection frequency increases. That is, the error of estimated yaw angle $\phi_r$ indicative of a vehicle condition becomes larger as the lane-defining-line non-detection frequency increases. Accordingly, the frequency of the erroneous alarms also increases under this condition. Upon taking account of the tendency, by setting anticipated deviation time Tttlc according to lane-defining-line non-detection frequency such that anticipated deviation time Tttlc is decreased as the lane-defining-line non-detection frequency increases, it becomes possible to properly decrease the frequency of the erroneous alarms.

Subsequently, there is discussed a second embodiment of the lane deviation alarm system. The second embodiment of the lane deviation alarm system basically has the same construction as the first embodiment has, as far as there is no specific explanation.

Figure 19:
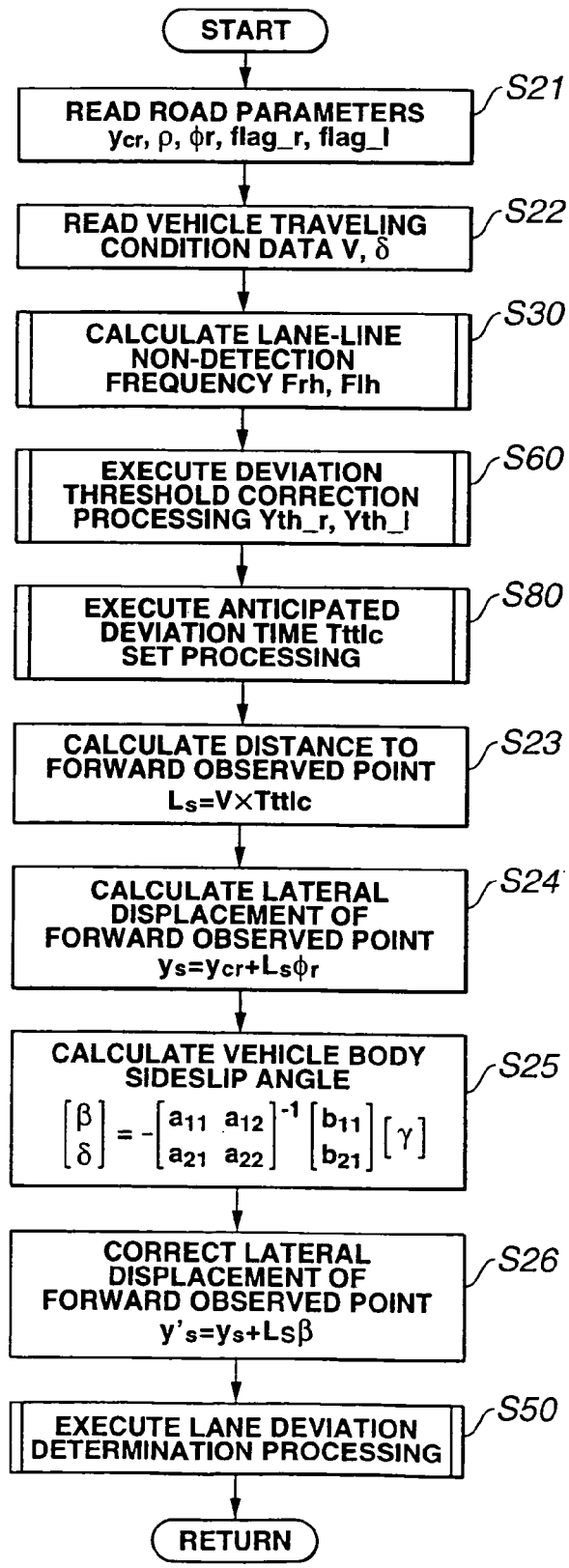
FIG. 19 is a flowchart showing a procedure of a traveling condition monitor processing executed by the controller of the lane deviation alarm system according to a second embodiment of the present invention.

FIG. 19 shows a procedure of the traveling condition monitor processing executed by controller 2 in the second embodiment according to the present invention. This processing basically corresponds to the processing shown in FIG. 10 in the first embodiment. In the processing shown in FIG. 19, instead of the process at step S40 in FIG. 10 of the first embodiment, a lateral displacement threshold correcting processing at step S60 and an anticipated deviation time set processing at step S80 are newly executed.

In the flowchart of FIG. 19, the contents of steps S21, S22, S30, S23–S26 and S50 are the same as those in the flowchart of FIG. 10 in the first embodiment, and therefore the explanation thereof is omitted herein.

In the flowchart of FIG. 19 in the second embodiment, after the calculation processing of lane-defining-line non-detection frequency at step S30 is executed, the processing of setting the anticipated deviation time is executed at step S60.

At step S60 controller 2 executes a processing of correcting or changing a deviation determination threshold.

At step S80 subsequent to the execution of step S60, controller 2 varies (sets) the anticipated deviation time employed for calculating the forward-observed-point lateral-displacement.

Subsequently, steps S23–S26 and S50 are sequentially executed as same as the first embodiment. By executing these steps, controller 2 determines the lane deviation tendency of the vehicle and generates a deviation alarm on the basis of the determination result. Further, by executing the processing at steps S60 and S80, even in a case that the candidate points of the lane-defining-line are decreased by Botts Dots or patchy looking of the lane-defining-line and therefore the lane-defining-line non-detection frequency increases thereby, it becomes possible to stably generate the deviation alarms so as to decrease the erroneous alarms. This suppresses the driver from unnecessarily having a noisy feeling.

Figure 20:
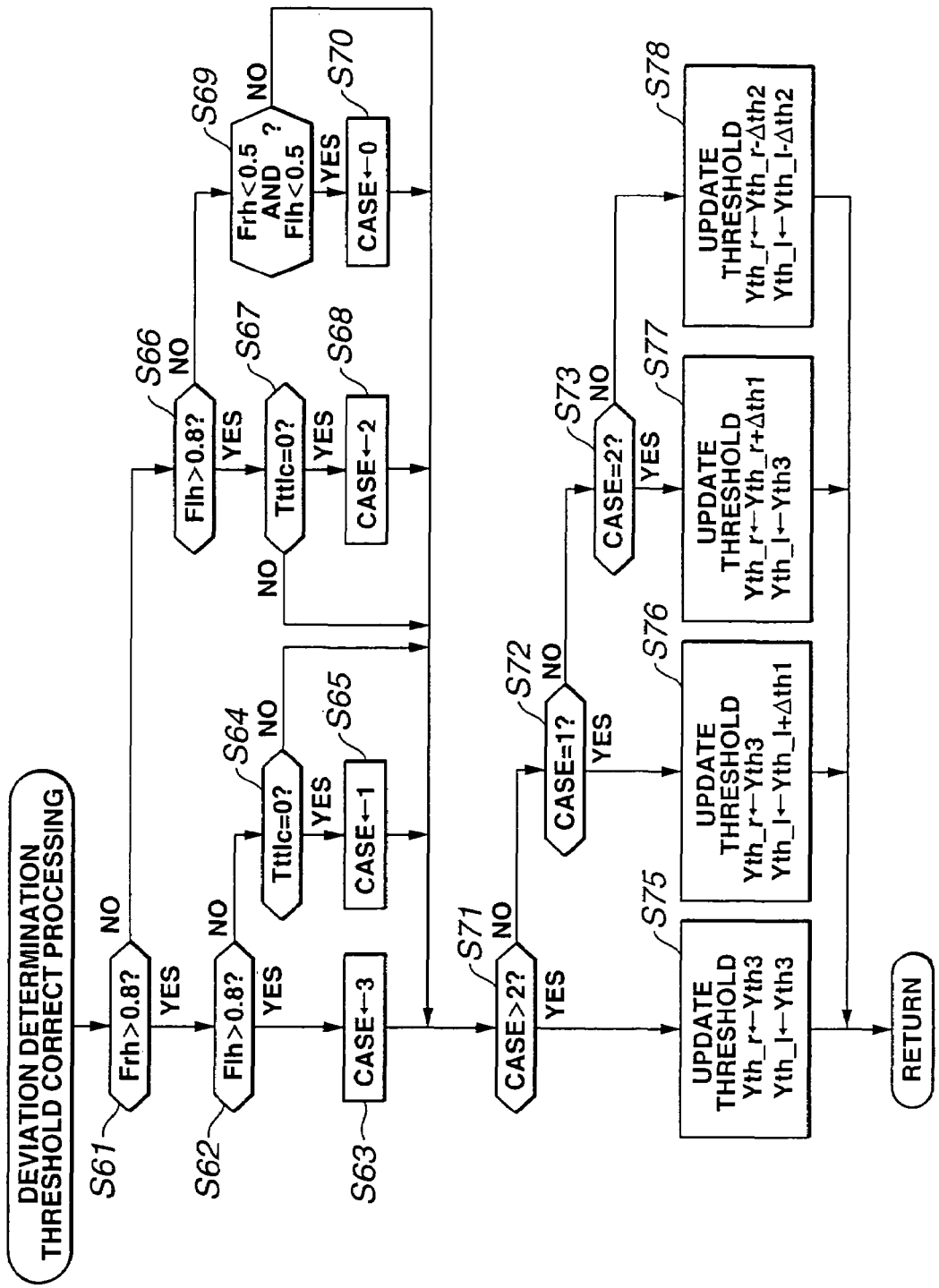
FIG. 20 is a flowchart showing a procedure of a deviation determination threshold correcting processing executed by the controller of the lane deviation alarm system according to the second embodiment of the present invention.

Subsequently, there is discussed the deviation determination threshold correcting processing executed at step S60. FIG. 20 shows a procedure of the deviation determination threshold correction processing. This processing basically comprises a first half processing including steps S61 through S70 and a second half processing including steps S71 through S78.

At step S61 controller 2 determines whether or not right line non-detection frequency Frh(t) obtained at step S30 is greater than a predetermined value such as 0.8. When the determination at step S61 is affirmative, that is, when right line non-detection frequency Frh(t) is greater than the predetermined value such as 0.8, the program proceeds to step S62. When the determination at step S61 is negative, that is, when right line non-detection frequency Frh(t) obtained at step S30 is smaller than or equal to predetermined value such as 0.8, the program proceeds to step S66.

At step S62 controller determines whether or not left line non-detection frequency Flh(t) obtained at step S30 is greater than a predetermined value such as 0.8. When the determination at step S62 is affirmative, that is, when left line non-detection frequency Flh(t) is greater than the predetermined value such as 0.8, the program proceeds to step S63. When the determination at step S62 is negative, that is, when left line non-detection frequency Flh(t) obtained at step S30 is smaller than or equal to predetermined value such as 0.8, the program proceeds to step S64. A situation that the program proceeds to step S63 is a situation that both of right and left line non-detection frequencies Frh(t) and Flh(t) are greater than the predetermined value. A situation that the program proceeds to step S64 is a situation that only right line non-detection frequency Frh(t) is greater than the predetermined value.

Although the second embodiment has been shown and explained such that the first predetermined value of the threshold is set at 0.8, it will be understood that the invention is not limited to this. The comparison between right line non-detection frequency Frh(t) and the predetermined value, and the comparison between left line non-detection frequency Flh(t) and the predetermined value are executed to determine the rate of detection of right line or left line. Accordingly, if the predetermined value certainly indicates that the decrease of the rate of the detection, it may take a value except for 0.8. For example, the predetermined value may be obtained from a running test with an actual vehicle.

At step S63 controller 2 sets a state exchange variable CASE at 3 (CASE=3). This state exchange variable CASE is used in the second half of the flowchart in FIG. 20. Thereafter, the program proceeds to step S71.

At step S64 controller 2 determines whether or not anticipated deviation time Tttlc is 0. (herein, anticipated deviation time Tttlc is a value obtained at step S80 executed subsequent to the deviation determination threshold correcting processing at step S60. That is, at step S64 controller 2 determines whether or not anticipated deviation time Tttlc obtained in the previous processing of the whole processing in FIG. 19 is 0. When the determination at step S64 is affirmative (Tttlc=0), the program proceeds to step S65. When the determination at step S64 is negative (Tttlc≠0), the program proceeds to step S71.

At step S65 controller 2 sets state exchange variable CASE at 2 (CASE=2). A situation that the program proceeds from step S64 to step S71 is a situation that anticipated deviation time Tttlc is not zero, and therefore under this situation the program proceeds to step S71 without changing state exchange variable CASE.

On the other hand, at step S66 subsequent to the negative determination at step S61, controller 2 determines whether or not left line non-detection frequency Flh(t) obtained at step S30 is greater than predetermined value such as 0.8. When the determination at step S66 is affirmative (Flh(t) >0.8), the program proceeds to step S67. When the determination at step S66 is negative (Flh(t)≦0.8), the program proceeds to step S69. A situation that the program proceeds to step S67 is a situation that only left line non-detection frequency Flh(t) is greater than the predetermined value. A situation that the program proceeds to step S69 is a situation that both of right and left line non-detection frequencies Frh(t) and Flh(t) are smaller than the predetermined value.

At step S67 controller 2 determines whether or not anticipated deviation time Tttlc is 0. Herein, anticipated deviation time Tttlc is the same as anticipated deviation time Tttlc employed in step S64. That is, it is the anticipated deviation time Tttlc calculated at step S80 which is executed subsequently to the deviation determination threshold correcting processing at step S60. At step S80 controller determines whether or not anticipated deviation time Tttlc calculated in the previous main routine cycle is 0. When the determination at step S67 is affirmative (Tttlc=0), the program proceeds to step S68. When the determination at step S67 is negative (Tttlc≠0), the program proceeds to step S71.

At step S68, controller 2 sets state exchange variable CASE at 2 (CASE=2). Thereafter, the program proceeds to step S71. A situation that the program proceeds from step S67 to step S71 is a situation that anticipated deviation time Tttlc is not 0. Under this situation, the program proceeds to step S71 without changing state exchange variable CASE.

On the other hand, at step S69 controller 2 determines whether right line non-detection frequency Frh(t) is smaller than a predetermined value such as 0.5 and whether left line non-detection frequency Flh(t) is smaller than a predetermined value such as 0.5. When the determination at step S69 is affirmative, that is, when right line non-detection frequency Frh(t) is smaller than the predetermined value such as 0.5 and when left line non-detection frequency Flh(t) is smaller than the predetermined value such as 0.5, the program proceeds to step S70. The affirmative determination at step S69 represents that both of right and left line non-detection frequencies are recovered. When the determination at step S69 is negative, the program proceeds to step S71. Herein, the predetermined value is set to have a hysteresis with respect to the predetermined value such as 0.8 employed at steps S61, S62 and S66.

Although the second embodiment has been shown and explained such that the second predetermined value of the threshold is set at 0.5, it will be understood that the invention is not limited to this. The comparison between right line non-detection frequency Frh(t) and the second predetermined value, and the comparison between left line non-detection frequency Flh(t) and the second predetermined value are executed to determine the recovery of the rate of detection of right line or left line. Accordingly, if the second predetermined value certainly indicates that the recovery of the rate of the detection or if it certainly indicates that the output signal of camera system 1 is stable, it may take a value except for 0.5. For example, the second predetermined value may be obtained from a running test with an actual vehicle.

At step S70 controller 2 sets state exchange variable CASE at 0 (CASE=0), and thereafter the program proceeds to step S71. In case that the program proceeds from step S69 to step S71, the program proceeds to step S71 without changing state exchange variable CASE.

In the processing executed at steps S71 through S78 discussed hereinafter, controller 2 determines the value of state exchange variable CASE obtained in the first half processing and executes a setting of the deviation determination threshold according to the determination result.

At step S71, controller 2 determines whether or not state exchange variable CASE is greater than 2. When the determination at step S71 is affirmative (CASE>2), the program proceeds to step S75. When the determination at step S71 is negative (CASE≦2), the program proceeds to step S72.

At step S72 controller 2 determines whether or not state exchange variable CASE is equal to 1. When the determination at step S72 is affirmative (CASE=1), the program proceeds to step S76. When the determination at step S72 is negative (CASE≠1), the program proceeds to step S73.

At step S73 controller 2 determines whether or not state exchange variable CASE is equal to 2. When the determination at step S73 is affirmative (CASE=2), the program proceeds to step S77. When the determination at step S73 is negative (CASE≠2), the program proceeds to step S78.

With this programming from step S71 to step S73, when state exchange variable CASE is equal to 0 (CASE=0), the program proceeds to step S78. When state exchange variable CASE is equal to 1 (CASE=1), the program proceeds to step S76. When state exchange variable CASE is equal to 2 (CASE=2), the program proceeds to step S77. When state exchange variable CASE is equal to 3 (CASE=3), the program proceeds to step S75.

That is, the update of the deviation determination threshold is executed through the execution of steps S75 through S78. More specifically, the processing of step S75 is executed when both of right and left line non-detection frequencies Frh(t) and Flh(t) are high (CASE=3). Accordingly, at step S75 controller 2 sets both of right deviation determination threshold Yth_r and left deviation determination threshold Yth_l at Yth3 which is the largest value.

The processing at step S76 is executed when right line non-detection frequency Frh(t) is high and anticipated deviation time Tttlc is 0 (CASE=1). Accordingly, at step S76 controller 2 sets right deviation determination threshold Yth_r at Yth3 and increases left deviation determination threshold Yth_l by a quantity $\Delta$th1 so as to gradually correct left deviation determination threshold Yth_l to a larger value. Herein, the increasing correction of left deviation determination threshold Yth_l is executed until left deviation determination threshold Yth_l reaches a threshold Yth2. The threshold Yth2 is larger than a normal threshold Yth1 which is an initial value, and is smaller than the threshold Yth3 which is employed in case that the non-detection frequency is the largest.

The processing at step S77 is executed when left line non-detection frequency Flh(t) is high and anticipated deviation time Tttlc is 0 (CASE=2). Accordingly, at step S77 controller 2 sets left deviation determination threshold Yth_l at Yth3 and increases right deviation determination threshold Yth_r by quantity $\Delta$th1 so as to gradually correct right deviation determination threshold Yth_r to a larger value. Herein, the increasing correction of right deviation determination threshold Yth_r is executed until right deviation determination threshold Yth_r reaches threshold Yth2 where Yth1<Yth2<Yth3. The threshold Yth2 is larger than normal threshold Yth1 which is an initial value, and is smaller than the threshold Yth3 which is employed in case that the non-detection frequency is the largest.

The processing of step S78 is executed when both of right and left line non-detection frequencies Frh(t) and Flh(t) are low and therefore the line detecting condition is stable (CASE=0). Accordingly, at step S78 controller 2 decreases both of right and left deviation determination thresholds Yth_r and Yth_l by quantity $\Delta$th2 so as to gradually correct right and left deviation determination thresholds Yth_r and Yth_l to a larger value. Herein, the increasing correction of right deviation determination threshold Yth_r is executed until right and left deviation determination thresholds Yth_r and Yth_l reach the initial threshold Yth1. As discussed above, the deviation determination threshold correcting processing at step S60 is executed.

Figure 21:
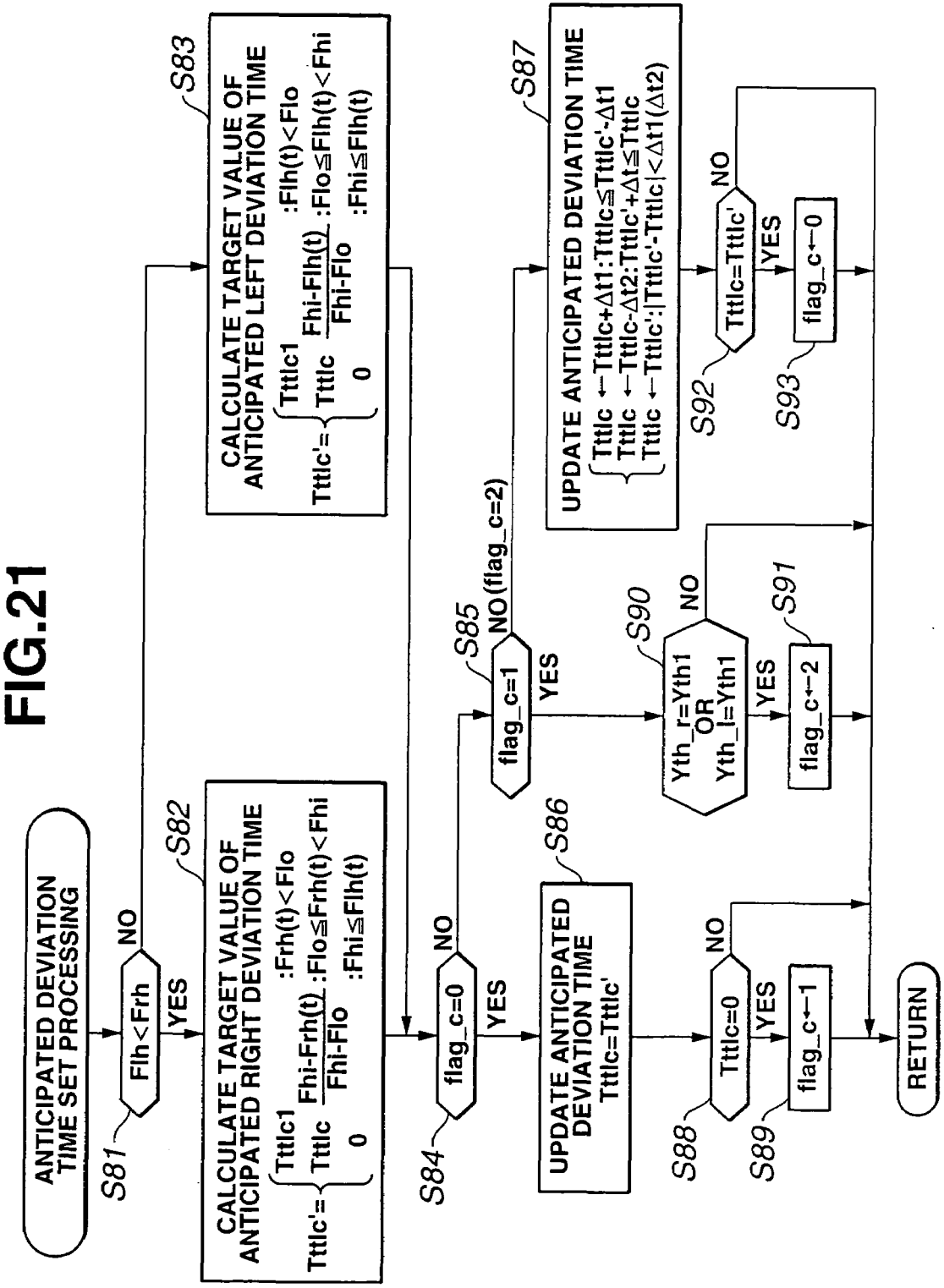
FIG. 21 is a flowchart showing a procedure of an anticipated deviation time set processing executed by the controller of the lane deviation alarm system according to the second embodiment of the present invention.

Subsequently, there is explained an anticipated deviation time set processing executed at step S80 with reference to a flowchart shown in FIG. 21.

At step S81 controller 2 selects the largest one of right line non-detection frequencies Frh(t) and the largest one of left line non-detection frequencies Flh(t), which are calculated at step S30 corresponding to steps S31 through S33. Further, controller 2 compares the selected right line non-detection frequency Frh(t) and the selected left line non-detection frequency Flh(t). Herein, when right line non-detection frequency Frh(t) is greater than left line non-detection frequency Flh(t), the program proceeds to step S82. When right line non-detection frequency Frh(t) is small than or equal to left line non-detection frequency Flh(t), the program proceeds to step S83.

At step S82 controller 2 calculates anticipated deviation time target value Tttlc' using the following expressions (40).

When $Frh(t)<Flo$, $Tttlc'=Tttlc1$.

When $Flo \leq Frh(t) < Fhi$, $Tttlc'=Tttlc1 \cdot ((Fhi-Frh(t))/(Fhi-Flo))$.

When $Fhi \leq Frh(t)$, $Tttlc'=0$. (40)

At step S83 controller 2 calculates anticipated deviation time target value Tttlc' using the following expressions (41)

When $Flh(t)<Flo$, $Tttlc'=Tttlc1$.

When $Flo \leq Flh(t) < Fhi$, $Tttlc'=Tttlc1 \cdot ((Fhi-Flh(t))/(Fhi-Flo))$.

When $Fhi \leq Flh(t)$, $Tttlc'=0$. (41)

The processing subsequent to the execution of step S82 or S83 is executed according to a value of state exchange flag flag_c. The relationship between the state exchange flag flag_c and the processed content is as follows.

When flag_c=0, controller 2 executes a processing after updated anticipated deviation time Tttlc corresponds to anticipated deviation time target value Tttlc' in the anticipated deviation time setting processing. When flag_c=1, controller 2 executes a processing of maintaining anticipated deviation time Tttlc without newly updating anticipated deviation time Tttlc. When flag_c=2, controller 2 executes a processing of gradually approaching anticipated deviation time Tttlc to anticipated deviation time target value Tttlc' by increasing anticipated deviation time Tttlc by a quantity $\Delta$t1 or by decreasing anticipated deviation time Tttlc by a quantity $\Delta$t2.

At step S84 subsequent to the execution of step S82 or S83, controller 2 determines whether or not state exchange flag flag_c is 0. When flag_c=0, the program proceeds to step S86. When flag_c≠0, the program proceeds to step S85.

At step S86 controller 2 executes a processing executed after anticipated deviation time Tttlc once corresponds to anticipated deviation time target value Tttlc'. More specifically, controller 2 updates by setting anticipated deviation time target value Tttlc' at anticipated deviation time Tttlc, so that anticipated deviation time always corresponds to anticipated deviation time target value Tttlc' in the processing thereafter.

At step S88 subsequent to the execution of step S86, controller 2 determines whether or not anticipated deviation time Tttlc reaches 0 as a result of the decreasing. When anticipated deviation time Tttlc is equal to 0 (Tttlc=0), the program proceeds to step S89 wherein controller 2 sets state exchanging flag flag_c at 0 (flag_c=0). As will discussed later, the processing executed when flag_c=0 is a processing of maintaining anticipated deviation time Tttlc without updating anticipated deviation time Tttlc. Therefore, when at step S89 state exchanging flag flag_c is set at 1, the processing executed thereafter is executed on the presumption that anticipated deviation time Tttlc is maintained. After the execution of step S89, the processing shown in FIG. 21 is terminated.

At step S85 subsequent to the negative determination at step S84, controller determines whether or not state exchanging flag flag_c is 1. When flag_c=1, the program proceeds to step S90. when flag_c≠1, that is, when flag_c=2, the program proceeds to step S87.

The processing of steps S85 and S90 is a processing of proceeding without updating anticipated deviation time Tttlc but maintaining anticipated deviation time Tttlc. At step S90 controller 2 determines whether or not at least one of right and left deviation determination thresholds Yth_r and Yth_l recovers to initial threshold Yth1.

At step S78 (CASE=0) during the deviation determination threshold correction processing of step S60, when the lane-defining-line detecting condition is stable, both of right and left deviation determination thresholds Yth_r and Yth_l are decreased by quantity Δth2 until both of right and left deviation determination thresholds Yth_r and Yth_l reach initial threshold Yth1.

Due to the above correction processing, the determination at step S90 determines whether right deviation determination threshold Yth_r or left deviation determination threshold Yth_l recovers to initial threshold Yth1. When the determination at step S90 is affirmative, that is, when right deviation determination threshold Yth_r or left deviation determination threshold Yth_l recovers to initial threshold Yth1 (Yth_r=1 or Yth_l=1), the program proceeds to step S91 wherein controller 2 sets state exchange flag flag_c at 2 (flag_c=2).

As will be discussed later, the processing (step S87) in case of flag_c=2 is a processing of bringing anticipated deviation time Tttlc closer to anticipated deviation time target value Tttlc' by increasing anticipated deviation time Tttlc by quantity Δt1 or decreasing anticipated deviation time Tttlc by quantity Δt2.

At step S87 subsequent to the negative determination at step S85, controller 2 updates anticipated deviation time Tttlc using the following expressions (42).

When $Tttlc \leq Tttlc'-\Delta t1$, $Tttlc=Tttlc1+\Delta t1$.

When $Tttlc'+\Delta t2 \leq Tttlc$, $Tttlc=Tttlc1-\Delta t2$.

When $|Tttlc'-Tttlc1|<\Delta t(\Delta t1$ or $\Delta t2)$, $Tttlc=Tttlc'$ (42)

As discussed above, at step S87, controller 2 executes the processing of bringing anticipated deviation time Tttlc closer to anticipated deviation time target value Tttlc' by increasing anticipated deviation time Tttlc by quantity Δt1 or decreasing anticipated deviation time Tttlc by quantity Δt2. Further, a processing of setting anticipated deviation time Tttlc at target value Tttlc' (Tttlc=Tttlc') in case of |Tttlc'Tttlc|<Δt (Δt1 or Δt2) is a processing for smoothly justifying anticipated deviation time Tttlc at target value Tttlc'(Tttlc=Tttlc') after anticipated deviation time Tttlc is increased by quantity Δt1 or decreased by quantity Δt2.

At step S92 controller 2 determines whether or not anticipated deviation time Tttlc corresponds to anticipated deviation time Tttlc' (Tttlc=Tttlc'?). When Tttlc=Tttlc', that is, when the justifying processing is executed at step S87, controller 2 sets state exchanging flag flag_c at 0 (flag_c=0). Thereafter, the processing of updating anticipated deviation time Tttlc at target value Tttlc' (processing of steps S84 and S86) is executed.

With the execution of the lateral displacement determination threshold correcting processing of step S60 and the anticipated deviation time setting processing of S60, when the lane-defining-line non-detection frequency is increasing, anticipated deviation time Tttlc is corrected to approach 0 and right deviation determination threshold Yth_r and left deviation determination threshold Yth_l are increased after anticipated deviation time Tttlc reaches 0. Further, when the lane-defining-line non-detection frequency is decreasing, that is, when the lane-defining-line detection frequency is increasing, both of right deviation determination threshold Yth_r and left deviation determination threshold Yth_l are corrected so as to become initial threshold Yth1. Additionally, when one of right and left deviation determination thresholds Yth_r and Yth_l recovers to initial threshold Yth1, anticipated deviation time Tttlc is corrected so as to become initial anticipated deviation time Tttlc1.

Subsequently, there is discussed a function and operation of the traveling condition monitor processing with reference to timing charts shown in FIGS. 22A through 2H.

Figure 22A:
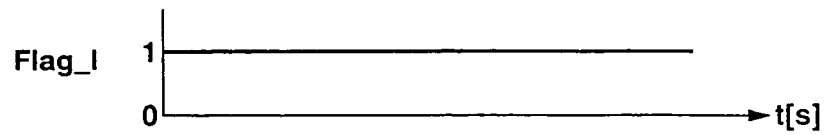
FIGS. 22A through 22H are timing charts explaining the operations of the lane deviation alarm system of the first embodiment according to the present invention.
Figure 22B:
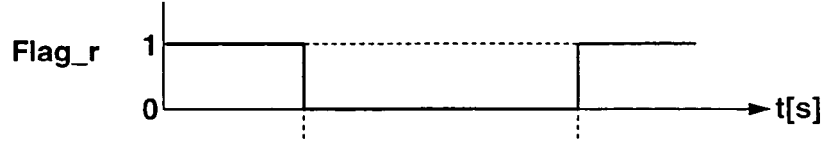

FIG. 22A shows a change of left line non-detection flag flag_l indicative of a left lane-defining-line detection condition picked up by camera system 1. FIG. 22B shows a change of right line non-detection flag flag_r indicative of a right lane-defining-line detection condition picked up by camera system 1.

In this embodiment, it is assumed that the non-detection of the right lane-defining-line continues for a relatively long time as shown in FIG. 22B. Under this condition, right line non-detection flag flag_r takes 0 and 1 for a long time.

Figure 22C:
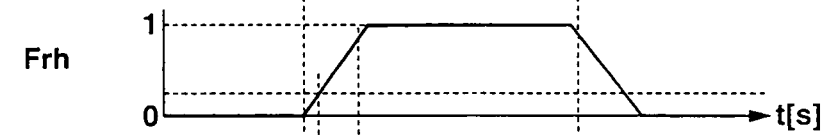

In the lane-defining-line non-detection frequency calculation processing executed at step S30, right lane-defining-line non-detection frequency Frh, which is calculated by the moving average processing of right lane-defining-line non-detection flag flag_r during the predetermined period, is varied as shown in FIG. 22C. In this embodiment, right line non-detection frequency Frh increases to 1 as shown in FIG. 22C when right line non-detection state by camera system 1 continues.

Figure 22D:
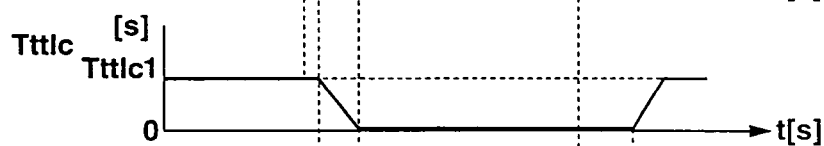

In the anticipated deviation time set processing executed at step S80, controller 2 sets anticipated deviation time Tttlc on the basis of right or left line non-detection frequency Frh or Flh. In this second embodiment, since right line non-detection frequency Frh is higher than left line non-detection frequency Flh, controller 2 sets anticipated deviation time Tttlc on the basis of right line non-detection frequency Frh. Since anticipated deviation time Tttlc is calculated so as to be in proportion to right line non-detection frequency Frh as is apparent from the expression (40), anticipated deviation time Tttlc is varied as shown in FIG. 22D. More specifically, anticipated deviation time Tttlc starts to decrease from fixed value Tttlc1 which is an initial value as right line non-detection frequency Frh increases. When right line non-detection frequency Frh reaches 1, anticipated deviation time Tttlc1 takes 0 (Tttlc1=0=Tttlc') at step S87.

In the anticipated deviation time setting processing of step S80, as is similar to the first embodiment, anticipated deviation time Tttlc is set on the basis of lane-defining-line non-detection frequencies Frh and Flh. Further, particularly in this second embodiment, anticipated deviation time target value Tttlc' is previously set on the basis of right line non-detection frequency Frh or left line non-detecting frequency Flh, and anticipated deviation time Tttlc is justified at the anticipated deviation time target value Tttlc'.

On the other hand, in the deviation determination threshold correcting processing at step S60, with reference to a one-cycle before anticipated deviation time Tttlc set on the basis of right line non-detection frequency Frh or left line non-detecting frequency Flh in the anticipated deviation time setting processing, when anticipated deviation time Tttlc reaches 0, deviation determination threshold Yth_r and Yth_l are increased by executing steps S75 through S77. This arrangement suppresses a change of start timing of the alarm during a period from a moment of starting the line non-detection state to a moment when a predetermined time elapsed from the start.

Figure 22E:
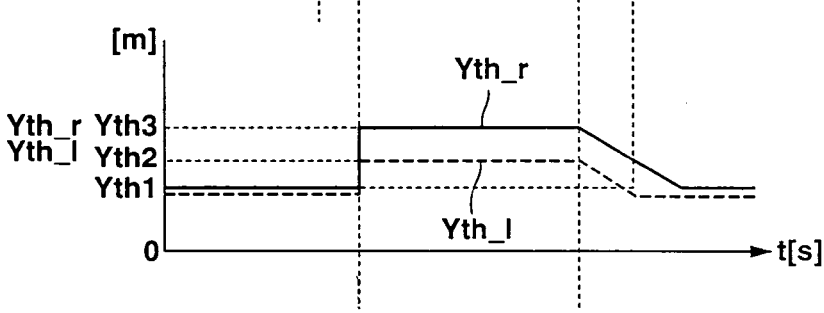

In the second embodiment, as shown in FIG. 22E, at a moment when anticipated deviation time Tttlc reaches 0, right line deviation determination threshold Yth_r of a line non-detection side is set at largest threshold Yth3, and left line deviation determination threshold Yth_l of a line detection side is changed from smallest threshold Yth1 to intermediate threshold Yth2 by the execution of step S76.

In the deviation threshold correcting processing at step S60, when both of right and left line non-detection frequencies increase to the predetermined value, by decreasing both of right and left deviation determination thresholds Yth_r and Yth_l by quantity Δth2 as shown in FIG. 22E, right and left deviation determination thresholds Yth_r and Yth_l are corrected until they reach initial threshold Yth1 through the execution of step S87.

As a result, when right and left deviation determination thresholds Yth_r and Yth_l reach initial threshold Yth1, anticipated deviation time Tttlc is corrected to 1 (target value Tttlc') by the anticipated deviation time set processing of step S80 and particularly by the execution of step S87, as shown in FIG. 22D.

The second embodiment according to the present invention is arranged to execute the anticipated deviation time setting processing at step S80 after the deviation determination threshold correcting processing at step S60 is executed, as shown in FIG. 19. This arrangement has a function that in case that the lane-defining-line detection state is recovered from a non-detection state of one lane-defining-line to a detection state of both lane-defining-lines, anticipated deviation time Tttlc is varied to the anticipated deviation time Tttlc1 which is employed when both lane-defining-lines are detected, after deviation determination threshold (in this embodiment, a deviation determination threshold of a line detected side under a condition that one of the lane-defining-lines is in non-detection state) reached the normal deviation threshold Yth1. By this arrangement, as shown in FIG. 22E, when the lane-defining-line detection state is recovered from a non-detection state of one lane-defining-line to a detection state of both lane-defining-lines, both of right and left deviation determination thresholds Yth_r and Yth_l are recovered to initial deviation determination threshold Yth1. Further, subsequently to this recovery, anticipated deviation time Tttlc is recovered to initial anticipated deviation time Tttlc1 as shown in FIG. 22D.

As discussed above, the second embodiment is arranged such that when both of line non-detection frequencies Frh and Flh become high, the anticipated deviation time Tttlc is gradually decreased to 0 by executing the deviation determination threshold correcting processing at step S80. Further, when anticipated deviation time Tttlc reaches 0 (a predetermined value), deviation determination thresholds Yth_r and Yth_l are changed to a large value by executing the deviation determination threshold correcting processing of step S60.

Subsequently, there is discussed the advantages gained by the second embodiment according to the present invention.

Even when the detection and the non-detection of the lane-defining-line by camera system 1 are alternately repeated, a processing for correcting an estimated value of the road parameters toward a correct value every time camera system 1 detects the lane-defining line. As a result, the influence of the line non-detection state by camera system 1 is not accumulated as an estimated value of the road parameter which includes a vehicle state quantity such as lateral displacement $y_{cr}$ and yaw angle $\phi_r$. Therefore, even if one of the lane defining lines is transiently put in the non-detection state, no erroneous alarm is generated.

However, when the non-detection state of the one lane defining line continues for a predetermined time period, the actual vehicle condition is put in a different state. For example, when the vehicle speed changes (increases), the vehicle receives aerodynamic lift due to the air flow which increases as the vehicle speed becomes higher. This varies the vehicle height and camera height h. Further when the vehicle is accelerated or decelerated, a direction of a vehicle front portion changes. For example, during the vehicle acceleration, the vehicle front portion is angled in the upward direction, and during the vehicle deceleration, the vehicle front portion is angled in the downward direction. Thus, when the direction of the vehicle front portion is changed due to the vehicle acceleration/deceleration operation, both of pitch angle a and camera height h are varied.

Thus, since camera height h varies according to the change of the vehicle speed or the acceleration/deceleration operation, it is necessary to take account of such a change of camera height h when the non-detection state of one lane defining line continues for the predetermined time. More specifically, the change of camera height h steadily affects the estimated values of the road parameters. If the estimated value of lateral displacement $y_{cr}$ varies, the frequency of the erroneous alarms will increase, and the driver will feel it noisy.

Figure 22F:
Figure 22G:
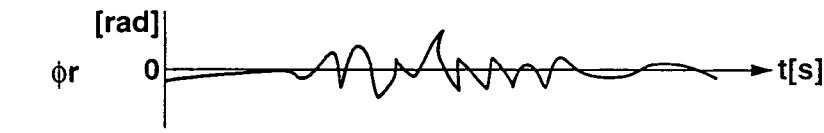
Figure 22H:
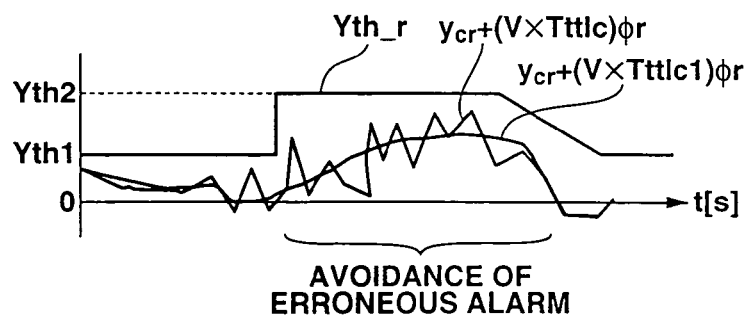

FIG. 22F shows a time-series change of lateral displacement $y_{cr}$ which is estimated while including the change of camera height h due to the vehicle speed change or acceleration/deceleration operation in a case that the non-detection state of one lane defining line continues for a predetermined long time. Further, when the non-detection state of one lane defining line continues, it is difficult to correctly estimate yaw angle $\phi_r$ and therefore yaw angle $\phi_r$ fluctuates as shown in FIG. 22G. Under this condition, if the lane deviation determination is executed on the basis of anticipated deviation time Tttlc and deviation determination threshold Yth1 which are used when both of the lane-defining-lines are detected, forward-observed-point lateral-displacement estimated value $y_s$ ($y_s = y_{cr} + (V \times Tttlc)\phi_r$) largely fluctuate with respect to deviation determination threshold Yth1, and increases its fluctuation amplitude due to the change of camera height h. Consequently, the frequency of erroneous alarms increases.

Subsequently, if deviation determination thresholds Yth_r and Yth_l are maintained at Yth1 and anticipated deviation time Tttlc is corrected toward 0, the change of forward-observed-point lateral-displacement $y_s$ becomes slow and stable as compared with the case of no-correction of anticipated deviation time Tttlc, as discussed in the first embodiment. However, the change of forward-observed-point lateral-displacement estimated value $y_s$ is largely influenced by lateral displacement estimated value $y_{cr}$. For example, as is apparent from the expression (30), even if anticipated deviation time Tttlc is corrected to a smaller value, lateral displacement estimated value $y_{cr}$ affects forward-observed-point lateral-displacement estimated value $y_s$. Accordingly, it is difficult to prevent the generation of the erroneous alarm.

On the other hand, if anticipated deviation time Tttlc is maintained at Tttlc1 and deviation determination thresholds Yth_r and Yth_l are corrected to a larger value upon taking account of lateral displacement estimated value $y_{cr}$, it is possible to decrease the frequency of erroneous alarms. However, in case that deviation determination thresholds Yth_r and Yth_l are corrected to decrease the erroneous alarm generated by the error of lateral displacement estimated value $y_{cr}$, a margin of the threshold set by the correction is used to decrease the frequency of the erroneous alarms generated by the fluctuation of yaw angle estimated value $\phi_r$. Accordingly, in case that yaw angle estimated value $\phi_r$ also fluctuates in addition to the fluctuation of lateral displacement estimated value $y_{cr}$, it is necessary to correct deviation determination thresholds Yth_r and Yth_l at excessively large values. Therefore, the control width of properly adjusting the alarm timing becomes very narrow.

Taking account of the above operations, the second embodiment according to the present invention is arranged such that when the line non-detection frequency Frh or Flh becomes high, anticipated deviation time Tttlc is gradually decreased toward 0 by the execution of the anticipated deviation time set processing of step S80, and when anticipated deviation time Tttlc reaches the predetermined value (0), deviation determination thresholds Yth_r an Yth_l are changed to larger values by the execution of the deviation determination threshold correcting processing at step S60.

With this arrangement of the second embodiment according to the present invention, even when the non-detection state of one lane-defining-line continues for a long time, anticipated deviation time Tttlc is gradually decreased to a smaller value toward 0 by executing the anticipated deviation time setting processing at step S80, during the initial period of the non-detection state of the one lane-defining-line. This properly decreases a rate of yaw angle component, which largely fluctuates, with respect to forward-observed-point lateral-displacement estimated value $y_s$. Further, when anticipated deviation time Tttlc reaches the predetermined (0 in this embodiment), deviation determination thresholds Yth_r and Yth_l are changed to the larger values by executing the deviation determination threshold correcting processing at step S60. Consequently, this arrangement removes the error of lateral displacement estimated value $y_{cr}$. That is, the second embodiment is arranged to correct the deviation determination threshold (lateral displacement determination threshold) to a large value for the purpose of decreasing the frequency of the erroneous alarms with respect to the fluctuation of yaw angle estimated value $\phi_r$ and the error of lateral displacement $y_{cr}$. Further, taking account of a timing of generating an error of lateral displacement estimated value $y_{cr}$, a timing of correcting the deviation determination threshold (lateral displacement determination threshold) at the large value is delayed at a timing that a predetermined time elapses from the non-detection state of the one lane-defining line.

With this arrangement, it becomes possible to prevent the erroneous alarm generated by the large fluctuation of the yaw angle estimated value, and to prevent the erroneous alarm generated by the error of the lateral displacement estimated value $y_{cr}$. This prevents the driver from having a noisy feeling of the alarm.

In the second embodiment, deviation determination thresholds Yth_r and Yth_l corresponding to both adjacent lanes are corrected. The deviation determination threshold of the detected line is also corrected.

For example, in case that the vehicle travels a line adjacent portion, if camera height h fluctuates due to the vehicle speed variation or acceleration/deceleration operation, lateral displacement estimated value $y_{cr}$ fluctuates. As a result, the start and stop of the alarm are repeated, and unnecessary alarm may be generated. In order to prevent such unnecessary alarm, the deviation determination threshold at a line detection side is also corrected. This correction prevents such unnecessary alarm even if camera height h fluctuates.

Further, the deviation determination threshold at the line detected side is set at a value smaller than that of the deviation determination threshold at the line non-detection side. That is, at the non-detection side, the position of the actual lane defining line is unstable, and therefore a criteria for determining the alarm generating timing based on the vehicle position is also ambiguous. Accordingly, in order to certainly prevent the erroneous alarm, the deviation determination threshold at the line non-detection side is set at the large value. In other words, since the frequency of the erroneous alarms at the line detected side is certainly smaller than that of the line non-detection side, it is possible to suppress the deviation determination threshold small. This suppresses the unnecessary alarm while maintaining the alarm function.

A start timing of the deviation alarm in case of the one-line non-detection state may slightly delay as compared with a start timing of the deviation alarm of the both-lines detected state. This delay may degrade the performance of the start timing. However, this arrangement decreases the noisy feeling while maintaining the alarm function.

It is clear from the expressions (14) through (17) that the coordinates at the non-detection line candidate point does not affect the error evaluating function for calculating fluctuation quantities $\Delta a$ through $\Delta e$. That is, fluctuation quantities $\Delta a$ through $\Delta e$ calculated using the expression (24) are correction quantities for decreasing an error between the actual line position and the position obtained from the model line using the estimated road parameters a through e, as possible. When the coordinates of the non-detection point is not clear, $K_{ij}=0$ is forcibly set. Accordingly, this does not affect the value of column vector $S_K$ in the expression (14), and therefore fluctuation quantities $\Delta a$ through $\Delta e$ are calculated from the detected line candidate point.

As a state that the number of the line candidate points of one side is extremely small, the following states are considered.

(1) A state that detected line candidate points are only points located considerably far from the host vehicle.
(2) A state that detected line candidate points are only points located considerably near the host vehicle.
(3) A state that detected line candidate points are only points between the states (1) and (2).

Under these states, a rate of the influence on the error performance function becomes unbalanced at the detected side. Accordingly, in the expression (22), column vector $S_K$ is calculated at the side where the lot of line candidate points are detected. As a result, fluctuation quantities $\Delta a$ through $\Delta e$ calculated by the expression (24) are also affected by the error of the intensively detected side. Thus, when the number of line candidate points of one line is extremely smaller than the number of line candidate points of the other line, the correction is executed based on the coordinates of the line candidate points having a high detection rate. As a result, the line candidate points at the low-detection rate side is strongly influenced by the error of the high-detection rate side. Therefore, the road parameters steadily generate an error.

Further, since the second embodiment has been arranged to add the expression (17) to the error performance function so as to smoothly move the road parameters along the time-axis, the non-detection of the line candidate point affects fluctuation quantities Δa through Δe, in the strict sense. However, the influence of the non-detection decreases toward 0 as the time elapses. Accordingly, if a state that the number of the line candidate points at the non-detection side is very small continues for a time, the influence on the fluctuation quantities Δa through Δe becomes almost zero.

On the other hand, using the road parameters obtained from a line model, forward-observed-point lateral-displacement estimated value $y_s$ is calculated referring to the expression (30). Therefore, when the number of the line candidate points at one side is extremely small, the road parameters steadily generate errors. Forward-observed-point lateral-displacement estimated value $y_s$ includes errors due to the steady error of the road parameters. However, since right and left deviation determination thresholds Yth_r and Yth_l corresponding to both adjacent lanes are corrected, it becomes possible to decrease the erroneous alarm. Specifically, by determining right and left deviation determination thresholds Yth_r and Yth_l taking account of the error, the reduction of the erroneous alarm is further effectively achieved.

If the detecting line candidate points are not 0 and steadily 1 or more, the steady error in the road parameters greatly becomes small as compared with the completely non-detection state. Therefore, even when deviation determination thresholds Yth_r and Yth_l are changed taking account of the error, the changed quantity thereof extremely becomes small. As a result, further effectively, erroneous alarm is decreased.

Although the invention has been shown and described by explaining the first and second embodiments, the invention is not limited to these explanations. For example, when a setting of a picking-up condition of camera system 1 is changed, anticipated deviation time Tttlc may be set at a small value. Herein, the picking-up condition includes an exposure control set in response to the change of photo-environment, a shutter speed and the like.

When the photo-environment fluctuates, a brightness level of an image picked-up by camera system 1 also fluctuates. As a result, there causes a possibility that a detection condition of a lane defining line is degraded thereby. Accordingly, when the setting of the exposure control and the shutter speed are changed, anticipated deviation time Tttlc has been previously set at a smaller value in anticipation of the fluctuation of photo-environment. That is, by setting anticipated deviation time Tttlc at a smaller value at an early stage before the detection condition of the lane-defining line degrades, it becomes possible to suppress the fluctuation of forward-observed-point lateral-displacement $y_s$ at an early stage, even when one of the lane defining lines is not detected. This decreases the frequency of the erroneous alarms, and therefore decreases the noisy feeling applied to the driver.

Further, when a high frequency of the non-detection continues for a relatively long time, the alarm function of the non-detection side is stopped, that is, alarm device 7 stops the determination of the lane deviation tendency based on the lane defining line of the non-detection side and informs the driver of the stopping state of the alarm function. By this arrangement, under a condition that a criteria for determining a timing of generating alarm in relation to the vehicle position is not determined, alarm device 7 certainly stops the alarm as far as the vehicle travels within the traveling lane. This arrangement prevents unnecessary alarms which applies noisy feeling to the driver and certainly informs the inoperative state of alarm device 7 to the driver.

Further, the second embodiment according to the present invention is arranged to correct deviation determination thresholds Yth_r and Yth_l for the purpose of decreasing the frequency of erroneous alarms. For example, deviation determination thresholds Yth_r and Yth_l may be increased as the lane-defining-line non-detection frequency increases. Although the second embodiment according to the present invention has been shown and described such that the camera system 1 has an image picking-up function and an image processing function, the invention is not limited to this. That is, the image processing function may be executed by other system. For example, controller 2 may have the image processing function and executes the image processing of the images picked-up by camera system 1.

In the explanation of the preferred embodiments according to the present invention, the processing shown in FIG. 3, which is executed by the image processing function of camera system 1, constructs yaw angle detecting means for detecting the yaw angle of host vehicle 10 on the basis of both lane defining lines detected by lane-defining-line detecting means of camera system 1. As is clear from the processing in FIG. 3, camera system 1 obtains yaw angle φr as a road parameter.

The processing at step S23 of FIG. 10 executed by controller 2 constructs forward-observed-point calculating means for calculating the forward-observed-point by multiplying the vehicle speed and the predetermined anticipated deviation time. The processing at step S24 of FIG. 10 executed by controller 2 constructs forward-observed-point lateral-displacement calculating means for calculating the forward-observed-point lateral-displacement on the basis of the yaw angle detected by the yaw angle detecting means and the forward-observed-point calculated by the forward-observed-point calculating means. The processing at step S50 of FIG. 10 executed by controller 2 constructs lane deviation tendency determining means for determining whether the host vehicle is in a lane deviation tendency, on the basis of the forward-observed-point lateral-displacement calculated by the forward-observed-point lateral-displacement calculating means. Alarm device 7 constructs lane deviation tendency informing means for informing the lane deviation tendency of the host vehicle on the basis of the determination result of the lane deviation tendency determining means.

The processing at step S40 (FIG. 12) in FIG. 10 executed by controller 2 constructs criteria changing means for changing a criteria of the lane deviation tendency of the host vehicle with respect to the lane deviation lines, on the basis of the detecting condition of the lane-defining-lines detected by the lane-defining-line detecting means. More specifically, when the lane-defining-line detecting means can detect only one of the lane defining lines, the criteria changing means changes the anticipated deviation time so as to decreases the influence of the yaw angle on the calculation of the forward-observed-point lateral-displacement.

As is apparent from the explanation of the first and second embodiments, the detection of the lane-defining-line and the non-detection of the lane-defining-line are determined on the basis of the line detection processing based on the picked-up image, and are different from an existence of the lane-defining-line and an absence of the lane-defining-line.

This application is based on Japanese Patent Application No. 2003-65424 filed on Mar. 11, 2003 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A lane deviation alarm system, comprising:
   a lane defining line detecting section that detects a lane defining line of a lane traveled by a host vehicle; and
   a criteria changing section that changes a criteria for determining a lane deviation tendency of the host vehicle, on the basis of a detecting condition of the lane defining line.

2. The lane deviation alarm system as claimed in claim 1, further comprising:
   a yaw angle detecting section that detects a yaw angle of the host vehicle on the basis of the detected lane defining lines;
   a forward observed point calculating section that calculates a forward observed point by multiplying a vehicle speed of the host vehicle and an anticipated deviation time;
   a forward observed point lateral displacement calculating section that calculates a lateral displacement at the forward observed point, on the basis of the yaw angle and the forward observed point;
   a lane deviation tendency determining section that determines whether the host vehicle is in a lane deviation tendency, on the basis of the forward observed point lateral displacement; and
   a lane deviation tendency informing section that informs a driver that the host vehicle is in the lane deviation tendency, on the basis of the determination result at the lane deviation tendency determining section,
   wherein the criteria changing section changes an anticipated deviation time so as to decrease the influence of the yaw angle on the calculation of the forward observed point lateral displacement when the lane defining line detecting section detects only one of both lane defining lines.

3. The lane deviation alarm system as claimed in claim 1, wherein the criteria changing section changes the criteria of the lane deviation tendency on the basis of the lane defining line, so that a decision of the lane deviation tendency is suppressed as frequency of detecting no lane defining line increases.

4. The lane deviation alarm system as claimed in claim 1, wherein the criteria changing section increases a change quantity of an anticipated deviation time as frequency of detecting no lane defining line increases.

5. The lane deviation alarm system as claimed in claim 2, wherein the lane deviation tendency determining section determines the lane deviation tendency by comparing the forward observed point lateral displacement and each threshold of each lane defining line, and
   further comprising a threshold changing means that changes the threshold when a state that the lane defining line detecting section detects one of both lane defining lines continues for a first predetermined time.

6. The lane deviation alarm system as claimed in claim 5, wherein the threshold changing section increases the change quantity of the threshold as the non detection frequency of the one lane defining line increases.

7. The lane deviation alarm system as claimed in claim 5, further comprising a lane defining line anticipating model which corrects a location of a lane defining line detected with a high detection frequency and a location of the other lane defining line detected with a low detection frequency, using a detection result of the lane defining line detected with the high detection frequency,
   wherein the correction result of the lane defining line locations using the lane defining line anticipation model affects the forward observed point lateral displacement to generate an error,
   wherein the threshold changing section determines the threshold taking account of the forward observed point lateral displacement including the error due to the correction result.

8. The lane deviation alarm system as claimed in claim 1, wherein the lane defining line detecting section includes a camera system which takes an image indicative of the lane defining lines of a traveling lane and which changes a setting of an image picking up condition according to the image picking up environment, and the criteria changing section changes the criteria when the setting of the image picking up condition is changed.

9. The lane deviation alarm system as claimed in claim 5, wherein the lane deviation tendency determining section stops the determination of the lane deviation tendency based on the undetected lane defining line when a state that the lane defining line detecting section detects one of both lane defining lines continues for a second predetermined time.

10. The lane deviation alarm system as claimed in claim 1, wherein the criteria changing section decreases an anticipated deviation time as the non detection frequency of the lane defining line increases.

11. The lane deviation alarm system as claimed in claim 5, wherein the threshold changing section increases the threshold when a state that the lane defining line detecting section detects one of both lane defining lines continues for the first predetermined time.

12. A lane deviation alarm system, comprising:
    a controller arranged
    to detect a lane defining line of a lane traveled by a host vehicle,
    to change a decision criteria for determining a lane deviation tendency of the host vehicle, on the basis of a detecting condition of the lane defining line, and
    to generate an alarm when the lane deviation tendency is determined by comparing a relationship between the host vehicle and the lane defining line with the criteria.

13. A method of generating an alarm when a lane deviation tendency of a host vehicle is determined, the method comprising:
    detecting a lane defining line of a lane traveled by a host vehicle; and
    changing a criteria for determining a lane deviation tendency of the host vehicle, on the basis of a detecting condition of the lane defining line.

14. A lane deviation alarm system, comprising:
    lane defining line detecting means for detecting a lane defining line of a lane traveled by a host vehicle; and
    criteria changing means for changing a criteria for determining a lane deviation tendency of the host vehicle, on the basis of a detecting condition of the lane defining line.

15. The lane deviation alarm system as claimed in claim 1, further comprising a lane deviation tendency determining section that determines whether the host vehicle is in a lane deviation tendency.

16. The lane deviation alarm system as claimed in claim 1, wherein the criteria is an anticipated deviation time.

17. The lane deviation alarm system as claimed in claim 16, wherein the anticipated deviation time is changed on the basis of a frequency of detecting no lane defining line.

18. The lane deviation alarm system as claimed in claim 1, wherein the criteria is changed on the basis of a frequency of detecting no lane defining line.

* * * * *